United States Patent [19]
Oya et al.

[11] Patent Number: 5,774,498
[45] Date of Patent: Jun. 30, 1998

[54] DATA TRANSMITTING APPARATUS AND METHOD OF SAME

[75] Inventors: Noboru Oya; Takashi Totsuka; Yasunobu Kato; Hiroyuki Shioya, all of Tokyo, Japan

[73] Assignee: Sony Corporation, Tokyo, Japan

[21] Appl. No.: 702,479

[22] PCT Filed: Dec. 28, 1995

[86] PCT No.: PCT/JP95/02758

§ 371 Date: Nov. 8, 1996

§ 102(e) Date: Nov. 8, 1996

[87] PCT Pub. No.: WO96/20565

PCT Pub. Date: Jul. 4, 1996

[30]    Foreign Application Priority Data

Dec. 28, 1994   [JP]   Japan ..................................... 6-328629

[51] Int. Cl.$^6$ ..................................................... H04N 7/10
[52] U.S. Cl. .............................. 375/257; 375/377; 348/7; 455/4.2
[58] Field of Search .................................. 375/377, 259, 375/295, 257; 370/464, 465, 474, 476; 348/7, 12, 13, 17, 420, 421; 371/53; 455/3.1, 4.1, 4.2

[56]    References Cited

U.S. PATENT DOCUMENTS

| | | | |
|---|---|---|---|
| 5,461,415 | 10/1995 | Wolf et al. | 348/7 |
| 5,546,118 | 8/1996 | Ido | 348/7 |
| 5,568,180 | 10/1996 | Okamoto | 348/7 |
| 5,612,790 | 3/1997 | Sakamoto et al. | 386/69 |

FOREIGN PATENT DOCUMENTS

| | | | | |
|---|---|---|---|---|
| 7-264573 | 10/1995 | Japan | | H04N 7/173 |
| 8-32955 | 2/1996 | Japan | | H04N 7/173 |

*Primary Examiner*—Don N. Vo
*Assistant Examiner*—Amanda T. Le
*Attorney, Agent, or Firm*—Limbach & Limbach L.L.P.

[57]    ABSTRACT

A reordering device 1_1 rearranges the segments of each block of time series data comprised of a plurality of blocks in block units. A selecting device 2_1 selects from among a plurality of time series data S1_1 to 1_4 rearranged by the reordering device 1 by switching in accordance with the speed and transmits the corresponding segments of the selected time series data sequentially to the reordering device 3_1 etc. as the streams S2_1 etc. The repeat reordering device 3_1 rearranges the segments contained in the stream S2_1 in units of blocks so as to restore the original order and transmits this rearranged time series data.

31 Claims, 32 Drawing Sheets

(a)       (b)

| WRITE | READ |
|---|---|
| 7 | 7 |
| 6 | 3 |
| 5 | 5 |
| 4 | 1 |
| 3 | 6 |
| 2 | 2 |
| 1 | 4 |
| 0 | 0 |

FIG. 12
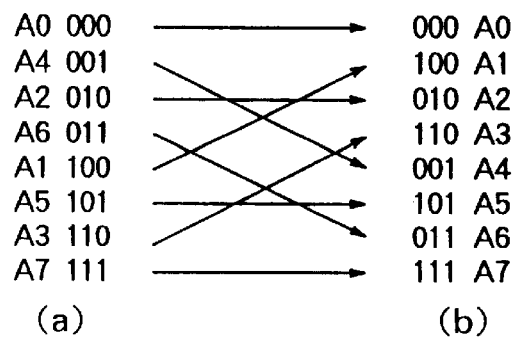
FIG. 13
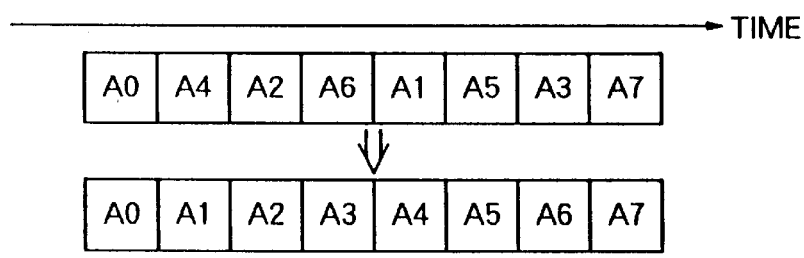
FIG. 14
| WRITE | READ |
|---|---|
| 7 | 7 |
| 6 | 3 |
| 5 | 5 |
| 4 | 1 |
| 3 | 6 |
| 2 | 2 |
| 1 | 4 |
| 0 | 0 |

| x2 | |
|---|---|
| WRITE | READ |
| 7 | 7 |
| 6 | 5 |
| 5 | 6 |
| 4 | 4 |
| 3 | 3 |
| 2 | 1 |
| 1 | 2 |
| 0 | 0 |

| x4,x8 | |
|---|---|
| WRITE | READ |
| 7 | 7 |
| 6 | 6 |
| 5 | 5 |
| 4 | 4 |
| 3 | 3 |
| 2 | 2 |
| 1 | 1 |
| 0 | 0 |

REW,x1

| WRITE | READ |
|---|---|
| 7 | 0 |
| 6 | 4 |
| 5 | 2 |
| 4 | 6 |
| 3 | 1 |
| 2 | 5 |
| 1 | 3 |
| 0 | 7 |

FIG. 30

REW,x2

| WRITE | READ |
|---|---|
| 7 | 4 |
| 6 | 6 |
| 5 | 5 |
| 4 | 7 |
| 3 | 0 |
| 2 | 2 |
| 1 | 1 |
| 0 | 3 |

FIG. 35

REW, x4

| WRITE | READ |
|-------|------|
| 7 | 6 |
| 6 | 7 |
| 5 | 4 |
| 4 | 5 |
| 3 | 2 |
| 2 | 3 |
| 1 | 0 |
| 0 | 1 |

REW,x8

| WRITE | READ |
|---|---|
| 7 | 7 |
| 6 | 6 |
| 5 | 5 |
| 4 | 4 |
| 3 | 3 |
| 2 | 2 |
| 1 | 1 |
| 0 | 0 |

DATA TRANSMITTING APPARATUS AND METHOD OF SAME

TECHNICAL FIELD

The present invention relates to a method and apparatus for transmitting data for use in a service such as video-on-demand (hereinafter also referred to as "VOD"), and more particularly relates to a data transmitting method and apparatus for transmitting audio, video, computer program, and other information in a special format such as fast forward, rewind, and pause and to a data receiving method and apparatus for receiving such audio, video, computer program and other information.

BACKGROUND ART

Along with the arrival of the age of multi-media, services have started which provide a variety of data through telecommunication networks. In such services, a large amount of data existing at a distant location is instantaneously transmitted via a telecommunications network upon receipt of a request for transmission. Here, the data includes all information which can be transmitted such as audio, video, computer program, and other information.

A variety of services are expected to be offered as a result of this. Here, as one example, VOD will be considered. This is a service for storing a large amount of video data such as movies or television programs in a server including a recording medium such as a large capacity hard disk and instantaneously transmitting the same via a telecommunications network upon receipt of a request for transmission from a viewer. The viewer can issue a request for special reproduction at any time in addition to designating normal reproduction. Here, "special reproduction" means an operation such as a pause, fast forward, or rewind operation.

A plurality of systems may be considered for the system for providing a VOD service. At this time, consideration will be given to the technique of transmitting the same series of data staggered by predetermined times t. This technique will be explained in brief below.

FIG. 1 shows time series data 5. This is considered divided into blocks 6 of a predetermined time t. FIG. 2 shows the state of transmission where transmission requests for the same time series data 5 generated at any time are quantized by the predetermined times t. A flow (hereinafter also referred to as a "stream") 30 of the output data is the time series data transmitted with respect to a transmission request generated at a time t30, while the streams 31 to 37 are time series data transmitted with respect to transmission requests generated at the times t31 to t37, respectively.

When viewing the different streams at the time t37 of FIG. 2, it is seen that the head of a block G in the stream 31, the head of a block F in the stream 32, the head of a block E in the stream 33, the head of a block D in the stream 34, the head of a block C in the stream 35, the head of a block B in the stream 36, and the head of a block A in the stream 37 are simultaneously transmitted. The arrows in FIG. 3 indicate the positions in the time series data which are simultaneously transmitted at that time.

In this technique, a plurality of transmission requests are assigned to a single stream so that the number of the streams does not become enormous in a case where there are a flood of transmission requests for the same time series data. While this cannot be referred to as VOD in the strict sense of the term, a pseudo VOD becomes possible by setting the time t in an allowable range.

Where the streams are not generated in a pseudo manner, but instead independently correspond to each request, special reproduction is possible by changing the reading position from the recording apparatus.

In the conventional method of transmitting data, however, if there are a flood of transmission requests for the same data, it becomes difficult to handle them all independently, so the technique of pseudo VDO as mentioned before for handling a plurality of requests by a single transmission all at once is adopted.

Accordingly, since data is simply transmitted by this technique, it has not been possible to respond to requests for special reproduction. When the reading position of the recording apparatus ends up changed, there is an effect on the streams of other viewers receiving the same stream, therefore there is a problem.

Further, in the conventional method of transmitting data, when performing fast forward or rewind reproduction, if there is a request to perform that reproduction at a variable speed such as 2×speed or 3×speed, there is a problem in that it is difficult to suitably respond to such a request.

DISCLOSURE OF THE INVENTION

The present invention was made in consideration with the above-mentioned problems of the prior art and has as an object thereof to provide a data transmitting apparatus which can suitably handle a flood of requests for transmission of the same data when such requests occur, a method for the same, a data receiving apparatus, and a method for the same.

Another object of the present invention is to provide a data transmitting apparatus which can suitably respond to a request that the data transmission be carried out at a variable speed, a method of the same, a data receiving apparatus, and a method of the same.

The data transmitting apparatus of the present invention has a rearranging means for rearranging, for a plurality of time series data having the same content to be transmitted staggered in time by exactly the amount of block data of a predetermined size, the order of a plurality of segment data of predetermined sizes constituting that block data by a predetermined pattern in units of the corresponding block data; a selecting means for selecting one from among the plurality of rearranged time series data; and a repeat rearranging means for restoring the order of the segment data of the selected time series data in units of the block data.

Further, the data transmitting apparatus of the present invention preferably has a selecting means which successively switches and selects one from among the plurality of rearranged time series data at predetermined time intervals in accordance with the predetermined speed.

Further, the data transmitting apparatus of the present invention preferably has a rearranging means which rearranges the order of the segment data in a pattern which arranges the segment data at positions corresponding to numbers obtained by reading in a reverse direction numbers given when numbering in an n-ary format in a temporal order the segment data contained in the block data.

Further, the data transmitting apparatus of the present invention preferably has a rearranging means which rearranges the order of the segment data by using different patterns for adjoining block data so that the time series data restored by the repeat rearranging means is comprised of segments located at predetermined intervals in the time series data before the rearrangement.

Further, the data transmitting method of the present invention rearranges, for a plurality of time series data having the same content to be transmitted staggered in time by exactly the amount of block data of a predetermined size, the order of a plurality of segment data of predetermined sizes constituting that block data by a predetermined pattern in units of the corresponding block data; selects one from among the plurality of rearranged time series data; and restores the order of the segment data of the selected time series data in units of the block data.

Further, the data transmitting method of the present invention preferably selects the time series data by successively switching one from among the plurality of rearranged time series data at predetermined time intervals in accordance with the predetermined speed.

Further, the data transmitting method of the present invention preferably has a pattern which arranges the segment data which rearranges the order of the segment data at positions corresponding to numbers obtained by reading in a reverse direction numbers given when numbering in an n-ary format in a temporal order the segment data contained in the block data.

Further, the data transmitting method of the present invention preferably rearranges the order of the segment data by using different patterns for adjoining block data so that the restored time series data is comprised of segments located at predetermined intervals in the time series data before the rearrangement.

Further, the data transmitting method of the present invention rearranges, for a plurality of time series data having the same content to be transmitted staggered in time by exactly the amount of block data of a predetermined size, the order of a plurality of segment data of predetermined sizes constituting that block data by a predetermined pattern in units of the corresponding block data; selects one from among the plurality of rearranged time series data; and restores the order of the segment data of the selected time series data in units of the block data.

In the data transmission of the present invention and the method of the same, when for example a request is issued from a user to the effect that he or she desires to receive a predetermined time series data, the rearranging means rearranges, for a plurality of time series data having the same content staggered in time by exactly the amount of block data of a predetermined size, the order of a plurality of segment data of predetermined times constituting that block data by a predetermined pattern in units of the corresponding block data.

Next, the selecting means selects one from among the plurality of rearranged time series data.

Next, the repeat rearranging means restores the order of the segment data of the selected time series data in units of the block data and transmits the restored time series data to the user.

Since the data transmitting apparatus of the present invention and the method of the same have the selecting means, it is possible to select from the plurality of streams at any time in accordance with a request.

Also, the data transmitting apparatus of the present invention and the method thereof enable special reproduction of variable speeds by rearranging and restoring the order of the segments.

Further, the data transmitting apparatus of the present invention and the method thereof enable high quality special reproduction by changing the pattern of rearrangement of the segment data for every block data.

Further, the data receiving apparatus of the present invention selectively receives a plurality of time series data having the same content transmitted staggered in time by exactly the amount of a block of a predetermined size wherein the block data is comprised of a plurality of segment data of predetermined sizes; each of the plurality of time series data has the order of the plurality of segment data rearranged to a predetermined pattern in units of the corresponding block data; and provision is made of a selecting means for selecting one from among the plurality of rearranged time series data and a repeat rearranging means for restoring the order of the segments of the selected time series data in units of the block data.

Further, the data receiving apparatus of the present invention preferably has a selecting means which successively switches and selects one from among the plurality of rearranged time series data at predetermined time intervals in accordance with a predetermined speed.

Further, the data receiving method of the present invention selectively receives the plurality of time series data having the same content transmitted staggered in time by exactly the amount of a block of a predetermined size. The block data is comprised of a plurality of segment data of predetermined sizes. Each of the plurality of time series data has the order of the plurality of segment data rearranged to a predetermined pattern in units of the corresponding block datas. One from among the plurality of rearranged time series data is selected, and the order of the segments of the selected time series data is restored in units of the block data.

Further, the data receiving method of the present invention preferably selects the time series data by successively switching one from among the plurality of rearranged time series data at predetermined time intervals in accordance with a predetermined speed.

BRIEF DESCRIPTION OF THE DRAWINGS

The above-mentioned objects and features and other objects and features of the present invention will be more apparent from the following description given with reference to the accompanying drawings, wherein:

FIG. 12 is a diagram for explaining a processing for restoring the arrangement of the segments in a repeat reordering device;

FIG. 13 is a diagram for explaining a relationship between the time series data for which the rearrangement of the segments is carried out and the time series data after the rearrangement of the segments is reversed;

FIG. 14 is a diagram for explaining the processing for rearrangement in the repeat reordering device in the case of 1×speed reproduction;

FIG. 30 is a diagram for explaining a stream generated in the repeat reordering device in a 2×speed rewind operation;

FIG. 35 is a diagram for explaining the processing for rearrangement in the case of a 4×speed rewind operation in the repeat reordering device;

FIG. 36 is a diagram for explaining the processing for rearrangement in the case of a 4×speed rewind operation in the repeat reordering device;

BEST MODE FOR CARRYING OUT THE INVENTION

Below, an explanation will be made of a data transmitting apparatus according to an embodiment of the present invention, a method thereof, a data receiving apparatus, and a method of the same.

Figure 4:
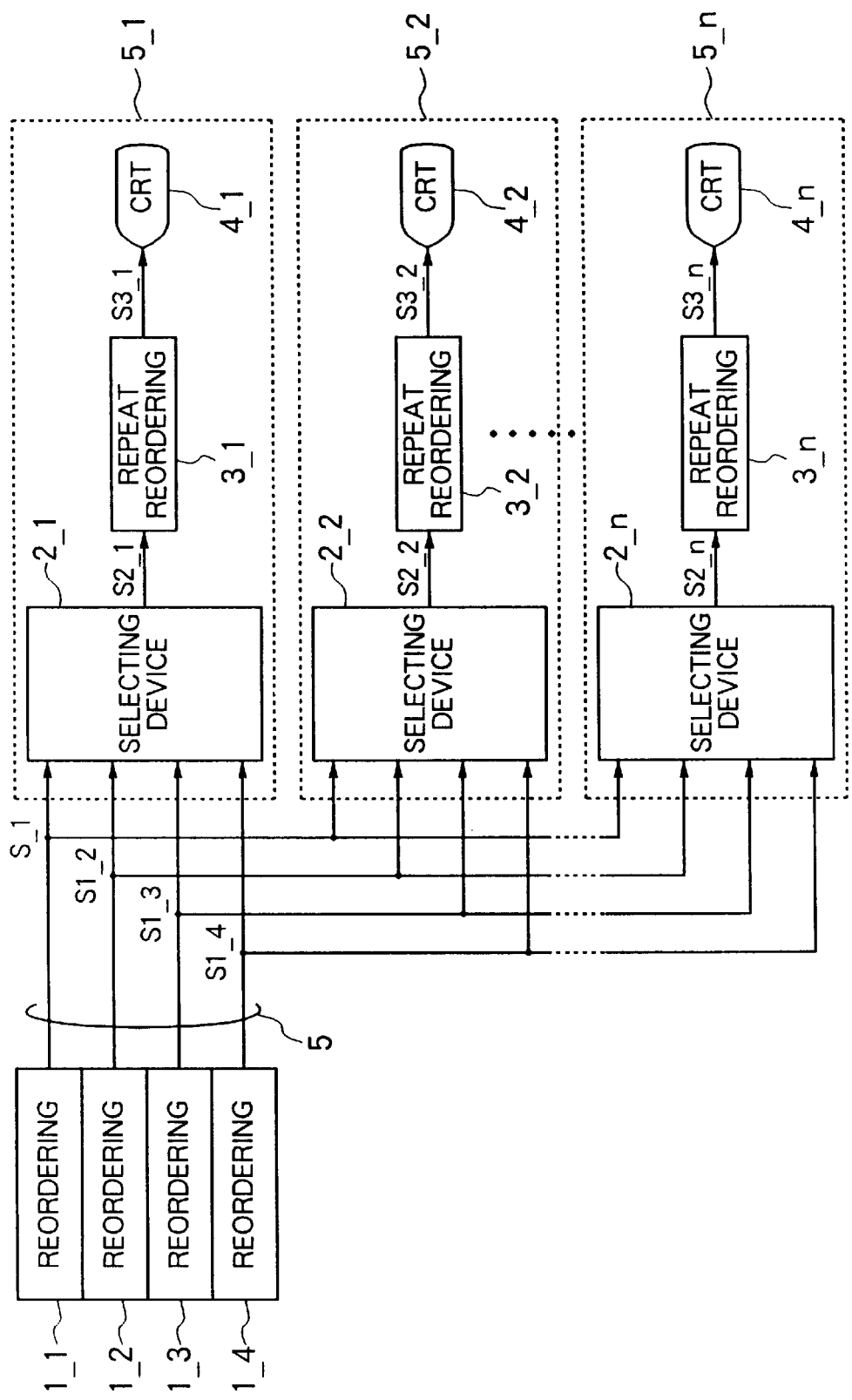
FIG. 4 is a block diagram of the configuration of a data transmitting apparatus according to an embodiment of the present invention.

FIG. 4 is a diagram of the configuration of the data transmitting apparatus according to the present embodiment.

As shown in FIG. 4, the data transmitting apparatus according to the present embodiment has a configuration in which, for example, reordering devices 1_1, 1_2, 1_3, and 1_4 are connected to selecting devices 2_1, 2_2, . . . , and 2_n via cables 5; and the selecting devices 2_1, 2—2, . . . , and 2_n are connected to repeat reordering devices 3_1, 3_2, . . . , and 3_n, respectively. One of the selecting devices 2_1, 2_2, . . . , and 2_n and repeat reordering devices 3_1, 3_2, . . . , and 3_n is provided in for example each home. CRTs (cathode ray tubes) 4_1, 4_2, . . . , and 4_n are connected to the repeat reordering devices 3_1, 3_2, . . . , and 3_n, respectively. That is, the respective data receiving terminals 5_1, 5_2, . . . , and 5_n in the homes are comprised of the selecting devices 2_1, 2_2, . . . , and 2_n, the repeat reordering devices 3_1, 3_2, . . . , and 3_n, and the CRTs 4_1, 4_2, . . . , and 4_n, respectively. Here, n indicates any integer of 3 or more.

The reordering device 1_1 changes the order of the segments 7 in each block 6 shown in FIG. 5 as will be explained later and outputs a stream to the selecting devices 2_1, 2_2, . . . , and 2_n. The reordering devices 1_2, 1_3, and 1_4 are basically the same as the reordering device 1_1, but are delayed in output time of the streams exactly by t, 2t, and 3t, respectively, with respect to the output time of the stream from the reordering device 1_1.

The selecting device 2_1 receives as its inputs the streams from the reordering devices 1_1, 1_2, 1_3, and 1_4, respectively, selects one from among them, and outputs the stream in accordance with this selection to the repeat reordering device 3_1. The selecting devices 2_2, . . . , and 2_n have basically the same configuration as that of the selecting device 2_1.

The repeat reordering devices 3_1, 3_2, . . . , and 3_n reorder a repeat time of the segments 7 contained in the streams respectively input from the selecting devices 2_1, 2_2, . . . , and 2_n in the blocks 6 as will be explained later and output these changed streams to the CRTs 4_1, 4_2, . . . , and 4_n, respectively.

The state of transmission of the data series in the data transmitting apparatus of the present embodiment is no different from that shown in FIG. 2 mentioned before, so the explanation will be made below referring to FIG. 2.

Figure 1:
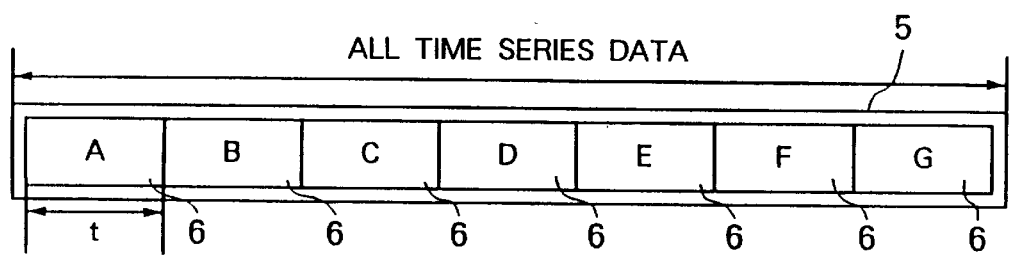
FIG. 1 is a diagram for explaining time series data.
Figure 2:
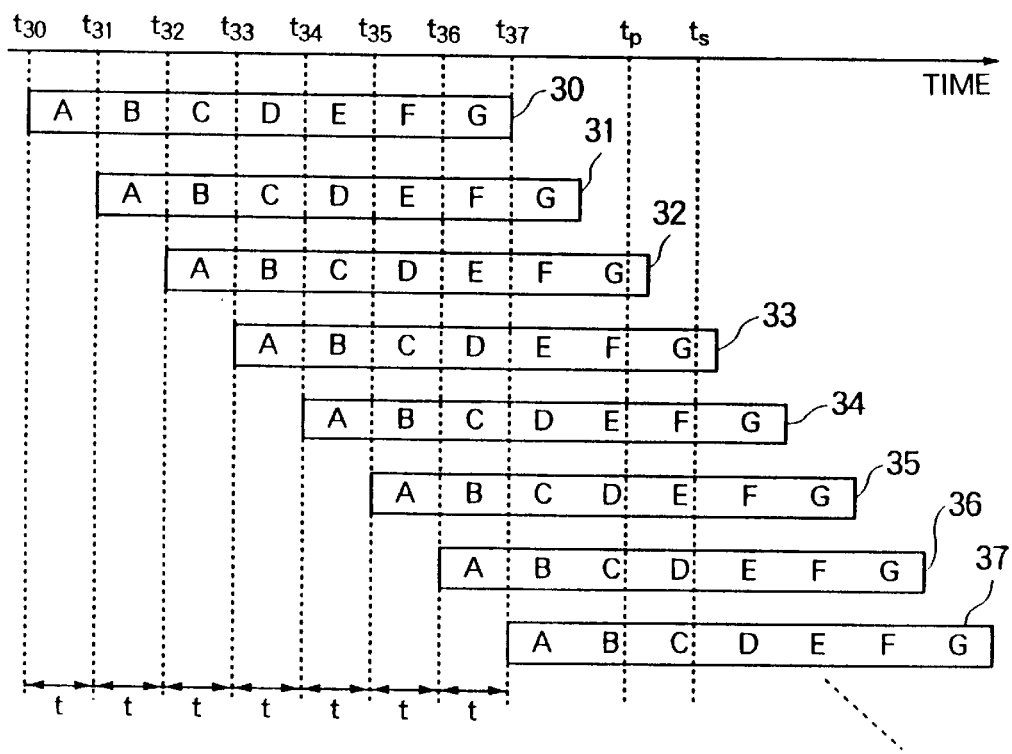
FIG. 2 is a diagram for explaining a timing at which the time series data is transmitted.
Figure 3:
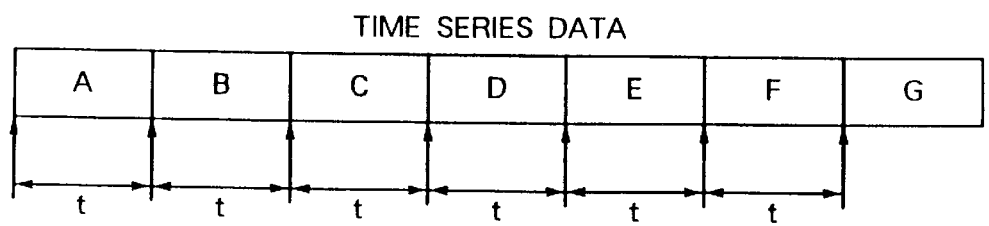
FIG. 3 is a diagram for explaining locations where data is simultaneously transmitted in a case where a plurality of accesses occur for the time series data.

In the data transmitting apparatus shown in FIG. 4, when a plurality of streams are transmitted staggered exactly by a time t as shown in FIG. 2, it is possible to use the selecting devices 2_1, 2_2, and 2_3 to select streams different from that of the conventional data transmitting apparatus and thereby easily realize special reproduction.

For example, assume that one of the viewers of the stream 35 shown in FIG. 2 requests a pause at a time tp and instructs a restart at a time ts. In the stream 35, the block D is transmitted at the time tp and a block E is transmitted at the time ts. When the pause is released and the transmission is restarted, it is enough to resend data from the block D to the viewer, therefore it is sufficient to select the stream 36. Since the selection is changed only for the viewer who requested the special reproduction, there is no effect upon other viewers who had been watching the same stream 35.

Further, switching the selection to an upper stream when viewed in FIG. 2 at a certain time results in a fast forward operation, while switching the selection to a lower stream results in the function of a rewind operation.

For example, assume that one of the viewers switches the selection to the stream 34 at the time tp. At the time tp, the stream 35 is transmitting the block D, while the stream 34 is transmitting the block E. The switching of the stream from 35 to 34 means a shift to the forward data exactly by a time t.

Figure 6:
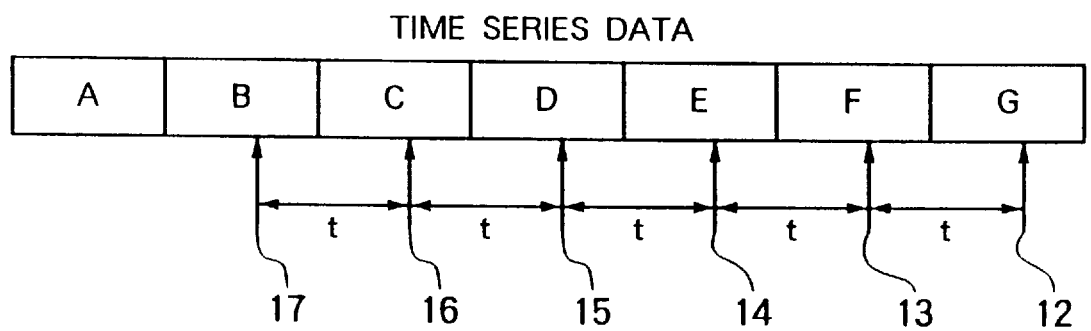
FIG. 6 is a diagram for explaining the change of the data transmission position in the time series data by the switching of a stream in an embodiment of the present invention.

FIG. 6 is a diagram for explaining the change of the data transmission position in the time series data which occurs as a result of switching of the stream.

At the time tp shown in FIG. 2, the stream 37 is transmitting at the position of the arrow 17 shown in FIG. 6; the stream 36 is transmitting at the position of the arrow 16; the stream 35 is transmitting at the position of the arrow 15; the stream 34 is transmitting at the position of the arrow 14; the stream 33 is transmitting at the position of the arrow 13; and the stream 32 is transmitting at the position of the arrow 12. The switching of the stream from 35 to 34 means a shift from the position of the arrow 15 to the position of the arrow 14.

Similarly, along with an upward switching to the stream 33 and stream 32, the arrow 13 and the arrow 12 will shift rearward in the time series data which corresponds to the execution of a fast forward operation.

Similarly, switching the selection to the lower streams 36 and 37 in FIG. 2 means a return of the arrows 16 and 17 back in the forward direction in the time series data and thus realization of the function of a rewind operation. With this alone, however, it is only possible to perform special reproduction at intervals of the predetermined time t, which is somewhat inconvenient.

Figure 5:
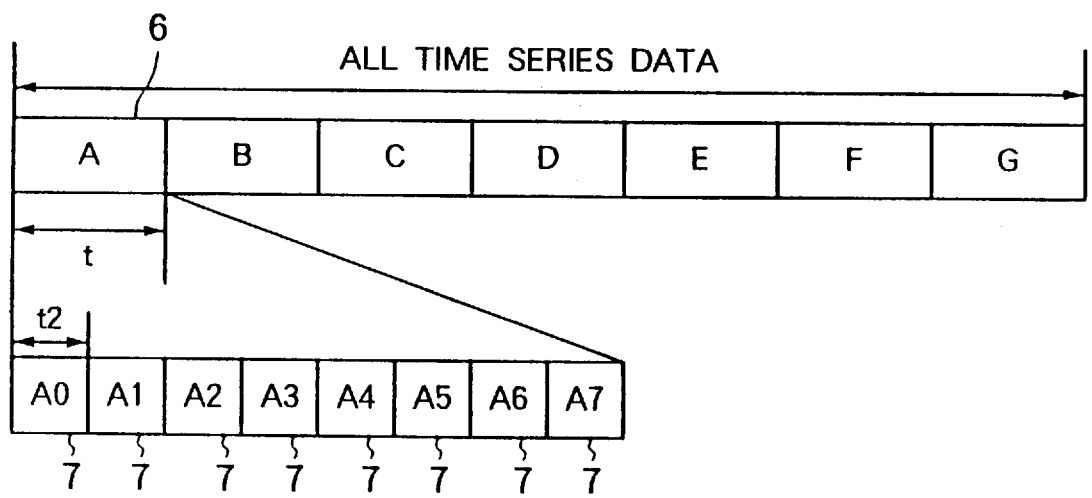
FIG. 5 is a diagram for explaining segments which serve as a unit of processing in an embodiment of the present invention.

In the present embodiment, as shown in FIG. 5, the block 6 in the time series data is divided into at least one segment 7 for every time t2. This segment 7 is used as the unit of processing. At this time, when n is an integer, t2 is selected so that t becomes t2 times a power of n. This is also known as numbering in a base n format where, for example, when n=2, it's binary, when n=3, ternary, when n=10, decimal, etc.

Figure 7:
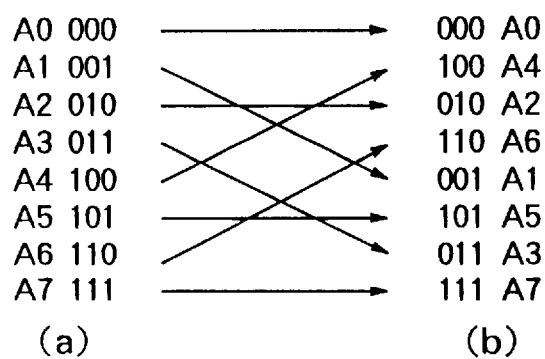
FIG. 7 is a diagram for explaining processing for rearrangement of the segments in a reordering device shown in FIG. 4.

FIG. 7 is a diagram for explaining the processing for rearrangement of the segments 7 in the reordering device 1_1.

Note that, the processing in the reordering devices 1_2, 1_3, and 1_4 is similar to the processing in the reordering device 1_1.

For example, assume that the block A is divided into eight segments A0 to A7 as shown in FIG. 5. Where n=2, t becomes equal to $t2 \times n^8$. Since 8 is 2 to the third power, 0 to 7 are represented by three-bit binary numbers which are made to correspond to A0 to A7, respectively (FIG. 7(*j*)).

Then, the bits of the binary number are reversed so that the most significant bit becomes the least significant bit. This reverse number is regarded as a usual binary number. The segments are rearranged so as to correspond to this number (FIG. 7(*b*)). Below, this operation will be referred to as a bit reverse operation.

Figure 8:
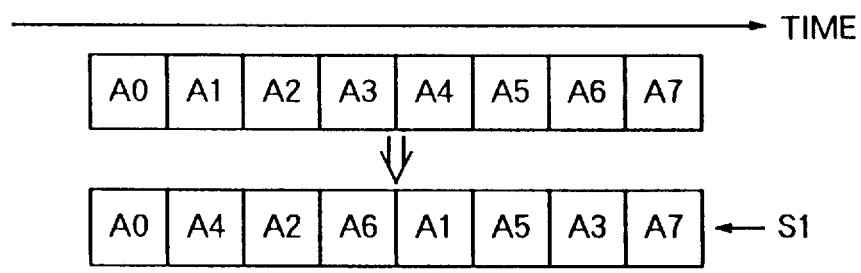
FIG. 8 is a diagram for explaining the relationship between the time series data before the rearrangement of the segments is carried out and the time series data after the rearrangement of the segments is carried out.

FIG. 8 is a diagram for explaining the relationship between the time series data before the rearrangement of the segments is carried out and the time series data after the rearrangement of the segments is carried out.

In the reordering device 1_1, at the time of normal reproduction, the segments A0 to A7 are rearranged as shown in FIG. 8. As shown in FIG. 4, the rearranged stream S1_1 is output to the selecting devices 2_1, 2_2, and 2_3. The selecting device 2_1, for example, selects this stream S1_1 and sequentially outputs it as the stream S2_1 to the repeat reordering device 3_1. The repeat reordering device 3_1 operates to restore the arrangement of the segments for the stream S2_1. The operation for repeat change can be performed by the same bit reverse procedure.

Figures 9, 10:
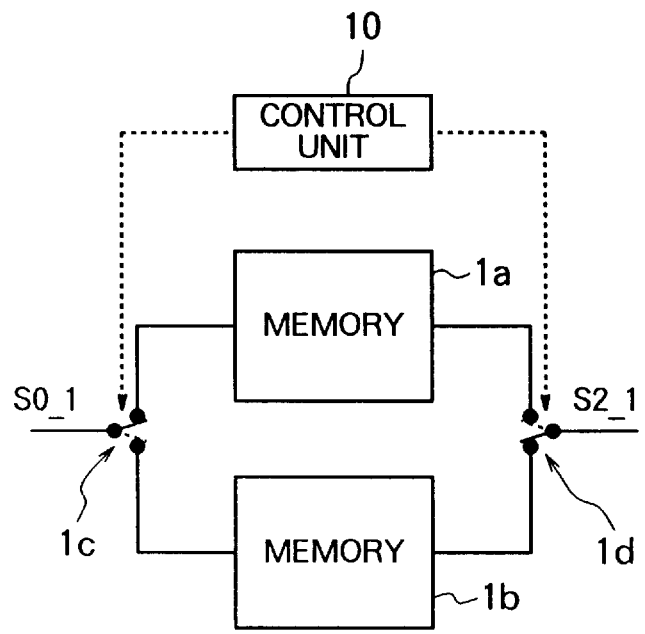
FIG. 9 is a block diagram of the configuration of a reordering device.
FIG. 10 is a diagram for explaining the process for rearrangement in the reordering device shown in FIG. 9 in the case of 1×speed reproduction.

The reordering device 1_1 is configured by for example, as shown in FIG. 9, a control unit 10, memories 1*a* and 1*b*, and switches 1*c* and 1*d*. Each of the memories 1*a* and 1*b* has a capacity large enough to store at least one block. In the reordering device 1_1, for example, in a state where the switch 1c is connected to the memory 1a by a control signal from the control unit 10, for example, as shown in FIG. 10, the eight segments contained in each block constituting the input stream S0_1 are stored (written) in the regions indicated by the addresses "0", "1", "2", "3", "4", "5", "6", and "7" of the memory 1a. Then, based on a control signal from the control unit 10, in a state where the switch 1c is connected to the memory 1b side and the switch 1d is connected to the memory 1a side, a read operation is carried out on the memory 1a in the order of the addresses "0", "4", "2", "6", "1", "5", "3", and "7". This read data is output as the stream S2_1 to the selecting device 2_1. At the same time, the next block data is stored in the memory 1b via the switch 1b.

Figure 11:
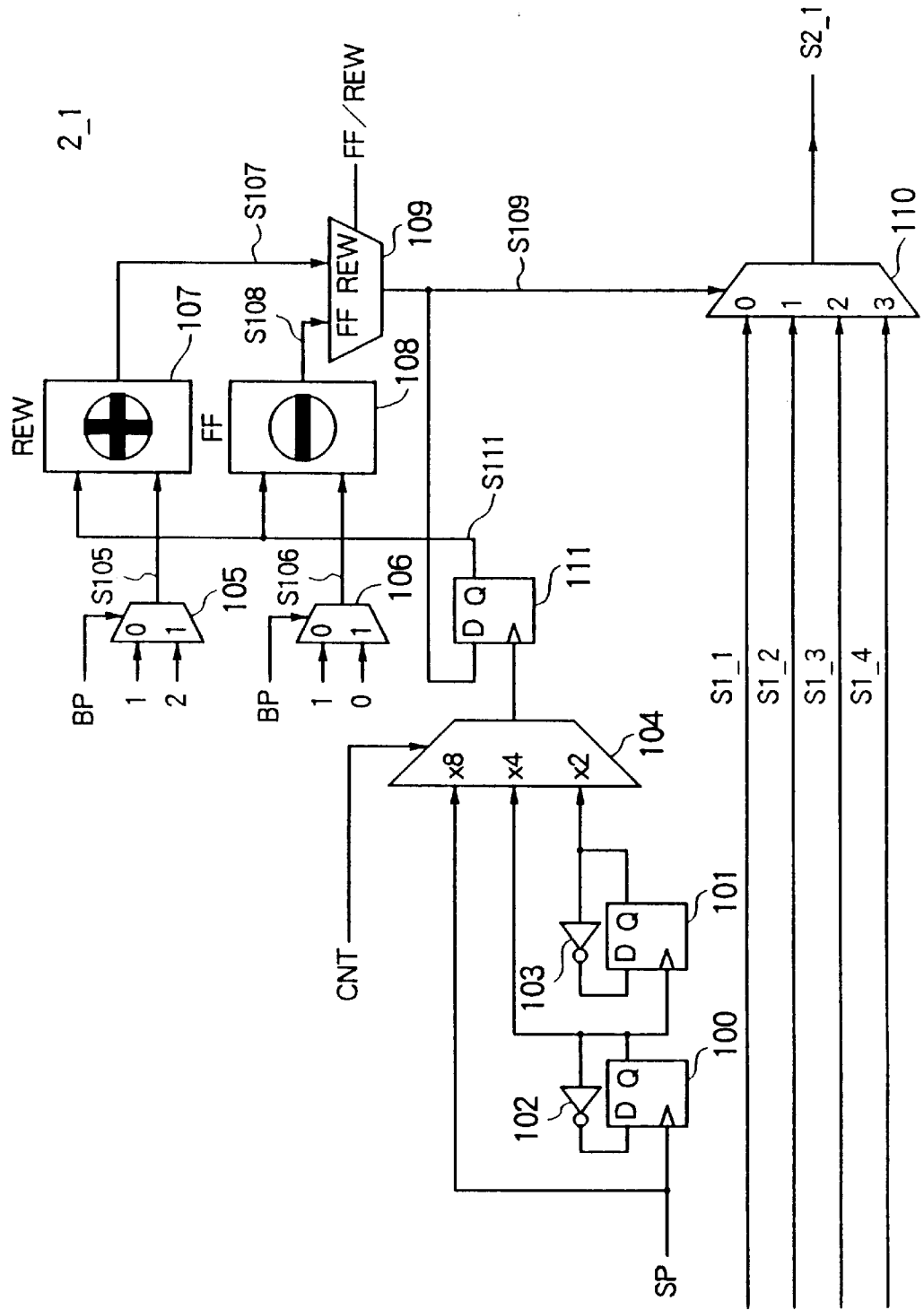
FIG. 11 is a block diagram of the configuration of a selecting device shown in FIG. 4.

FIG. 11 is a diagram of the configuration of the selecting device 2_1.

Note that the configuration of the selecting devices 2_2, . . . , and 2_n is basically the same as that of the selecting device 2_1.

As shown in FIG. 11, the selecting device 2_1 has D-flip-flops (FF) 100, 101, and 111, NOT circuits 102 and 103, selectors 104, 105, 106, 109, and 110, an adder circuit 107, and a subtractor circuit 108.

The D-FF 100 receives as its input a segment pulse signal (SP) from a CLK terminal. A Q-terminal is connected to the CLK terminal of the D-FF 101. Further, the Q-terminal of the D-FF 100 is connected to a D-terminal via the NOT circuit 102 and is also connected to one of the input terminals of the selector 104. Here, the segment pulse signal (SP) is a pulse signal corresponding to the head of each segment 7 shown in FIG. 5. This segment pulse signal is sent separately from the data from the reordering devices 1_1 to 1_4 or, although not illustrated, generated based on the data from the reordering devices 1_1 to 1_4 in the receiving terminals 5_1 to 5_n.

The Q-terminal of the D-FF 101 is connected to one of the input terminals of the selector 104 and is also connected to the D-terminal via the NOT circuit 103.

The selector 104 receives as its inputs the segment pulse signal, the Q-signal from the D-FF 100, and the Q-signal from the D-FF 101 and selectively outputs these signals to the adder circuit 107 and the subtractor circuit 108 in accordance with CNT. Here, CNT is a signal indicating 2×speed, 4×speed, or 8×speed. This CNT, although not illustrated, is a signal generated when input by the user using a button or remote controller of the receiving terminal.

The adder circuit 107 adds the value of the D-FF 111 and the value of the selector 105 and outputs the result of addition as a REW (rewind) switch signal S107 to the selector 109.

The selector 105 selectively outputs "1" or "2" the signal S105 to the adder circuit 107 based on the block pulse signal (BP). Here, the block pulse signal (BP) is a pulse signal corresponding to the head of each block 6 shown in FIG. 5. This block pulse signal (BP) is generated based on the data from the reordering devices 1_1 to 1_4 and is sent separately from the data from the reordering devices 1_1 to 1_4.

The subtractor circuit 108 subtracts the value of the selector 106 from the value of the D-FF 110 and outputs the result of this subtraction as the FF (fast forward) switch signal S108 to the selector 109.

The selector 106 selectively outputs "1" or "0" the signal S106 to the subtractor circuit 108 based on the block pulse signal (BP).

The selector 109 receives as its input a FF/REW (fast forward/rewind) switch signal. When the FF/REW switch signal indicates FF, it outputs the FF switch signal S108 as the switch signal S109 to the selector 110, while when the FF/REW switch signal indicates REW, it outputs the REW switch signal S107 as the switch signal S109 to the selector 110. This FF/REW switch signal is a signal generated when input by the user using the button or remote controller of the receiving terminal, though not illustrated.

The selector 110 selectively outputs the streams S1_1, S1_2, S1_3, and S1_4 input from the reordering devices 1_1, 1_2, 1_3, and 1_4 as the stream S2_1 to the repeat reordering device 3_1.

The selection processing in the selecting device 2_1 will be explained later.

FIG. 12 is a diagram for explaining the processing for restoring the arrangement of the segments 7 in the repeat reordering device 3_1.

FIG. 13 is a diagram for explaining the relationship between the time series data for which the rearrangement of the segments is carried out and the time series data after the rearrangement of the segments is reversed.

The arrangement of the segments before repeat reordering (FIG. 12(a)) is made to correspond to 0 to 7 by 3-bit binary numbers. By performing a bit reverse operation to rearrange the segments, they can be returned to their original order (FIG. 12(b)). Then, the repeat reordering device 3_1 transmits the stream restored to its original order.

The repeat reordering device 3_1 has the same configuration as that of for example the reordering device 1_1 shown in FIG. 9 and successively stores (writes) the eight segments contained in each block constituting the input stream S2_1 shown in FIG. 4 in the regions indicated by addresses "0", "1", "2", "3", "4", "5", "6", and "7" of the memory 1a shown in FIG. 9 as shown in, for example, FIG. 14. Then, in a state where the switch 1c is connected to the memory 1b side, and the switch 1d is connected to the memory 1a side, a read operation is performed on the memory 1a in the order of the addresses "0", "4", "2", "6", "1", "5", "3", and "7". This read data is output as the stream S3_1 to the CRT 4_1. At the same time, the next block data is stored in the memory 1b via the switch 1.

Below, an explanation will be made of a method of performing special reproduction by a bit-reversed data series.

Case of 2×speed fast forward operation For example, where a viewer requests a 2×speed fast forward operation, it is sufficient if the repeat reordering is carried out by using exactly a half of the segments of each block.

Figure 15:
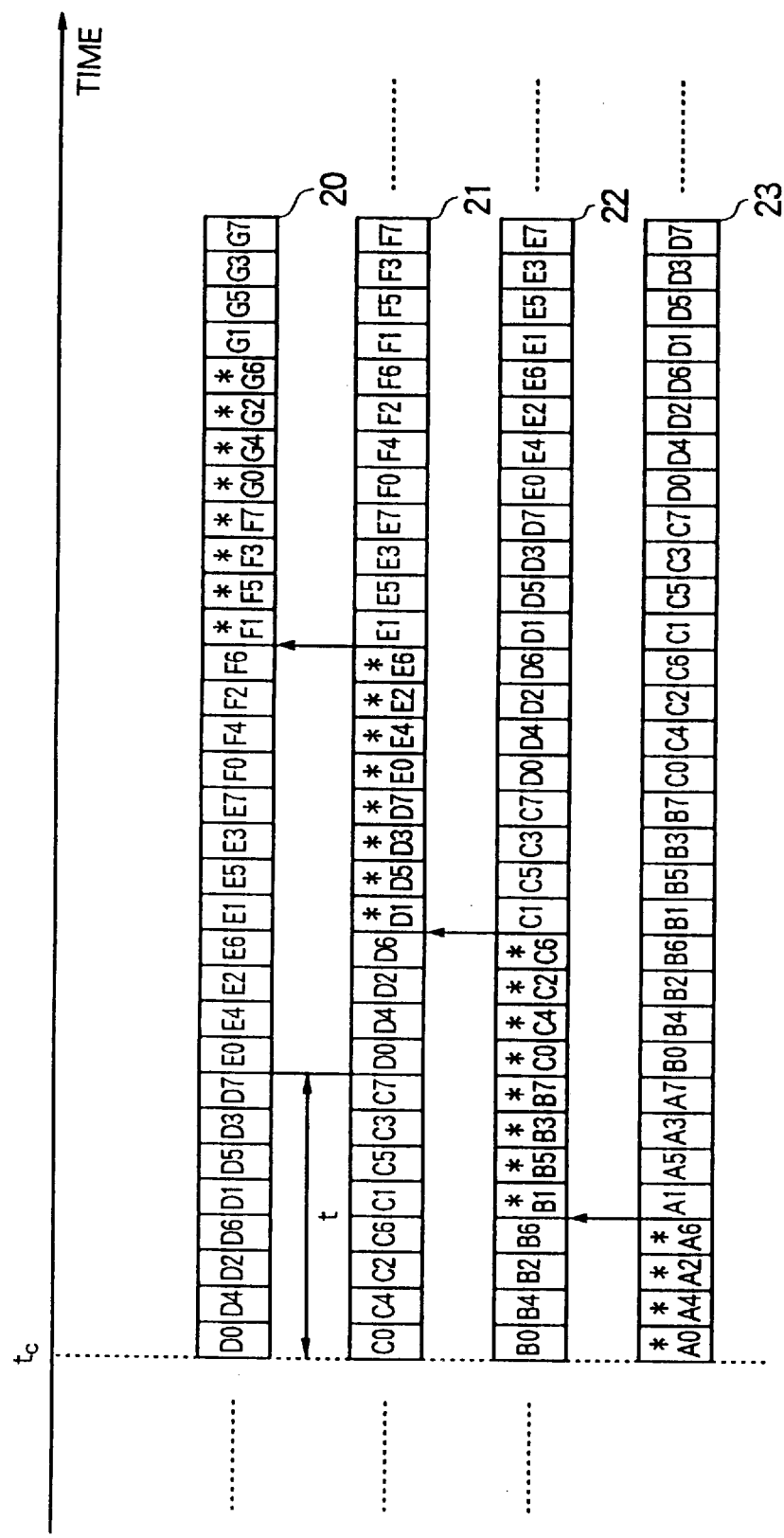
FIG. 15 is a diagram for explaining the switching operation of the selecting device shown in FIG. 4 when performing a 2×speed fast forward operation.

FIG. 15 is a diagram for explaining the switching operation of the selecting device 2_1 shown in FIG. 4 when performing a 2×speed fast forward operation.

FIG. 15 shows a situation wherein four streams 20 to 23 are transmitted staggered exactly by the time t. This is true also for the following figures. For example, assume that the 2×speed fast forward operation is started from the time tc of the stream 23.

In the example of FIG. 15, each block is composed of by eight segments, therefore it is sufficient so far as four segments each are taken out of each block. Namely, the reordering devices 1_1, 1_2, 1_3, and 1_4 shown in FIG. 4 output the streams 20 to 23 to the selecting device 2_1. First, the selecting device 2_1 takes out four segments A0, A4, A2, and A6 of the block A from the stream 23. Next, the selecting device 2_1 switches the stream and takes out segments B1, B5, B3, and B7 of the block B and the segments C0, C4, C2, and C6 of the block C from the stream 22. Next, the selecting device 2_1 switches the stream and takes out the segments D1, D5, D3, and D7 of the block D and the segments E0, E4, E2, and E6 of the block E from the stream 21. Next, the selecting device 2_1 switches the stream and takes out segments F1, F5, F3, and F7 of the block F and the segments G0, G4, G2, and G6 of the block G from the stream 20.

Figure 16:
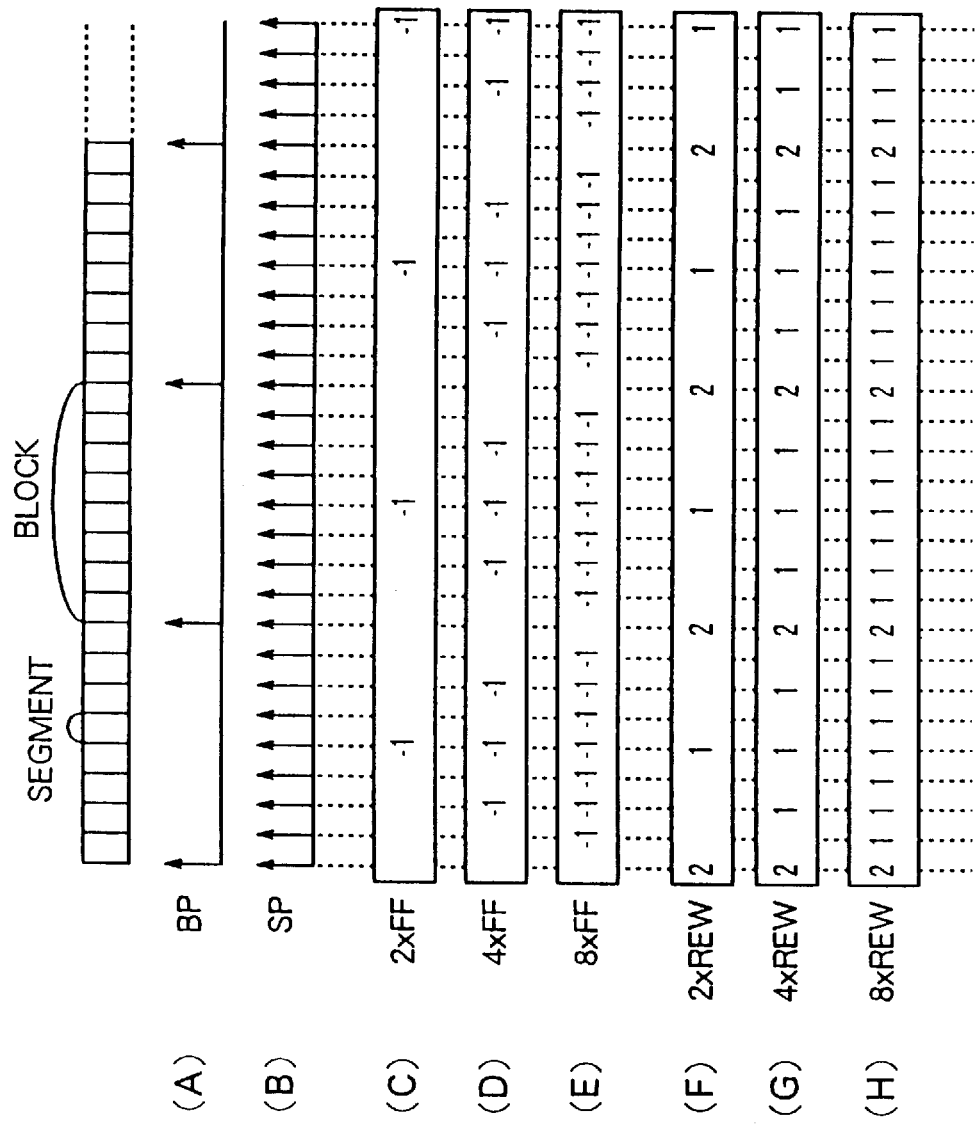
FIG. 16 is a diagram for explaining the processing for switching streams in the selecting device shown in FIG. 4.

FIGS. 16(A), 16(B), and 16(C) are diagrams for explaining the timing of switching of the streams in the selecting device 2_1 shown in FIG. 11 in the case of a 2×speed fast forward operation.

As shown in FIGS. 16(A) and 16(B), each time eight pulses of the segment pulse signal SP are output, a block pulse signal BP generating one pulse is output. A detailed explanation of this portion will be omitted.

Then, the selector 109 shown in FIG. 11 defines the value obtained by adding "−1" to the value of the D-FF 111 as the switch signal S109 and, at the same time, defines this value as the next value of the D-FF 111 at a timing when the fourth pulse of the segment pulse signal SP is output after the pulse of the block pulse signal BP is output. The D-FF 111 holds the number of the stream which is now selected. Addition of "−1" to this value means the switching of the stream in the direction from the stream 23 toward the stream 20 in FIG. 15.

At this time, the time series data output from the selecting device 2_1 to the repeat reordering device 3_1 becomes the data comprised of the segments marked by "*" shown in FIG. 15. Namely, the segments marked by "*" are taken out. These taken out segments to which "*" is added are the segments that the viewer actually sees. The segments not marked with "*" are not delivered to the viewer. Since every other segment of each block are taken out, a 2×speed fast forward operation is realized. Then, the repeat reordering device 3_1 rearranges the segments marked with "*" shown in FIG. 15 as shown in FIG. 17 and transmits the rearranged stream.

Figure 17:
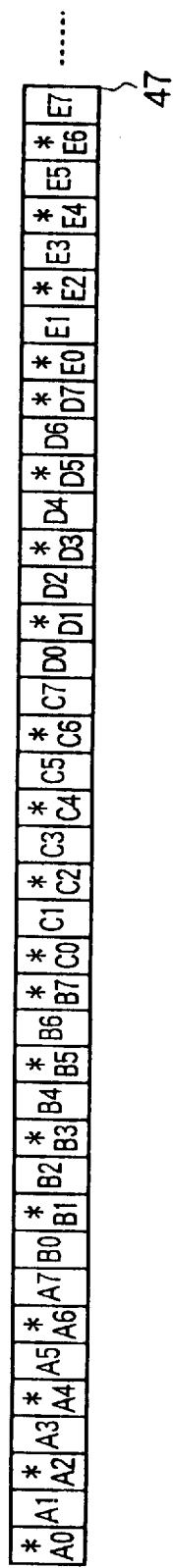
FIG. 17 is a diagram for explaining a stream generated in the repeat reordering device in a 2×speed fast forward operation.

Note that, FIG. 17 shows the state of a 2×speed fast forward operation seen on a time series. According to this, it is seen that in each block the number of the segments to be read out becomes halved.

Figures 18, 19:
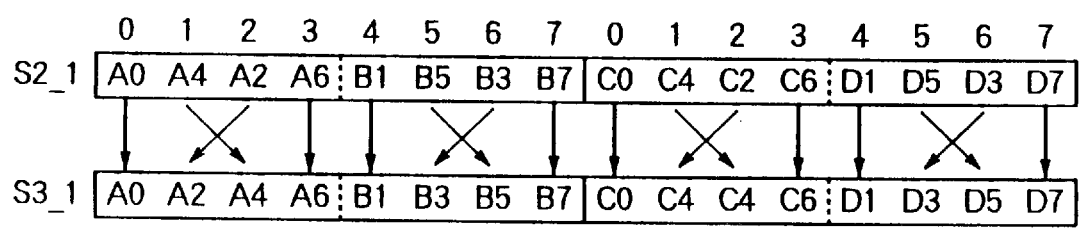
FIG. 18 is a diagram for explaining the processing for rearrangement in the case of a 2×speed fast forward operation in the repeat reordering device.
FIG. 19 is a diagram for explaining the processing for rearrangement in the case of a 2×speed fast forward operation in the repeat reordering device.

The repeat reordering device 3_1 sequentially stores (writes) the eight segments contained in each block constituting the input stream S2_1 in the regions indicated by addresses "0", "1", "2", "3", "4", "5", "6", and "7". of the memory 1a shown in FIG. 9 as shown in, for example, FIG. 18. Then, in a state where the switch 1c is connected to the memory 1b side and the switch 1d is connected to the memory 1a side, the memory 1a is read out in an order of the addresses "0", "2", "1", "3", "4", "6", "4", and "7". This read data is output as the stream S3_1 to the CRT 4_1. At this time, the repeat reordering device 3_1 rearranges the segments for the input stream S2_1 and outputs the stream S3_1 as shown in FIG. 19. By doing this, the relationship between segments is rectified in terms of time.

Case of 4×speed fast forward operation

Similarly, where the viewer requests a 4×speed fast forward operation, the repeat reordering is carried out by using exactly one-fourth of the segments of each block.

Figure 20:
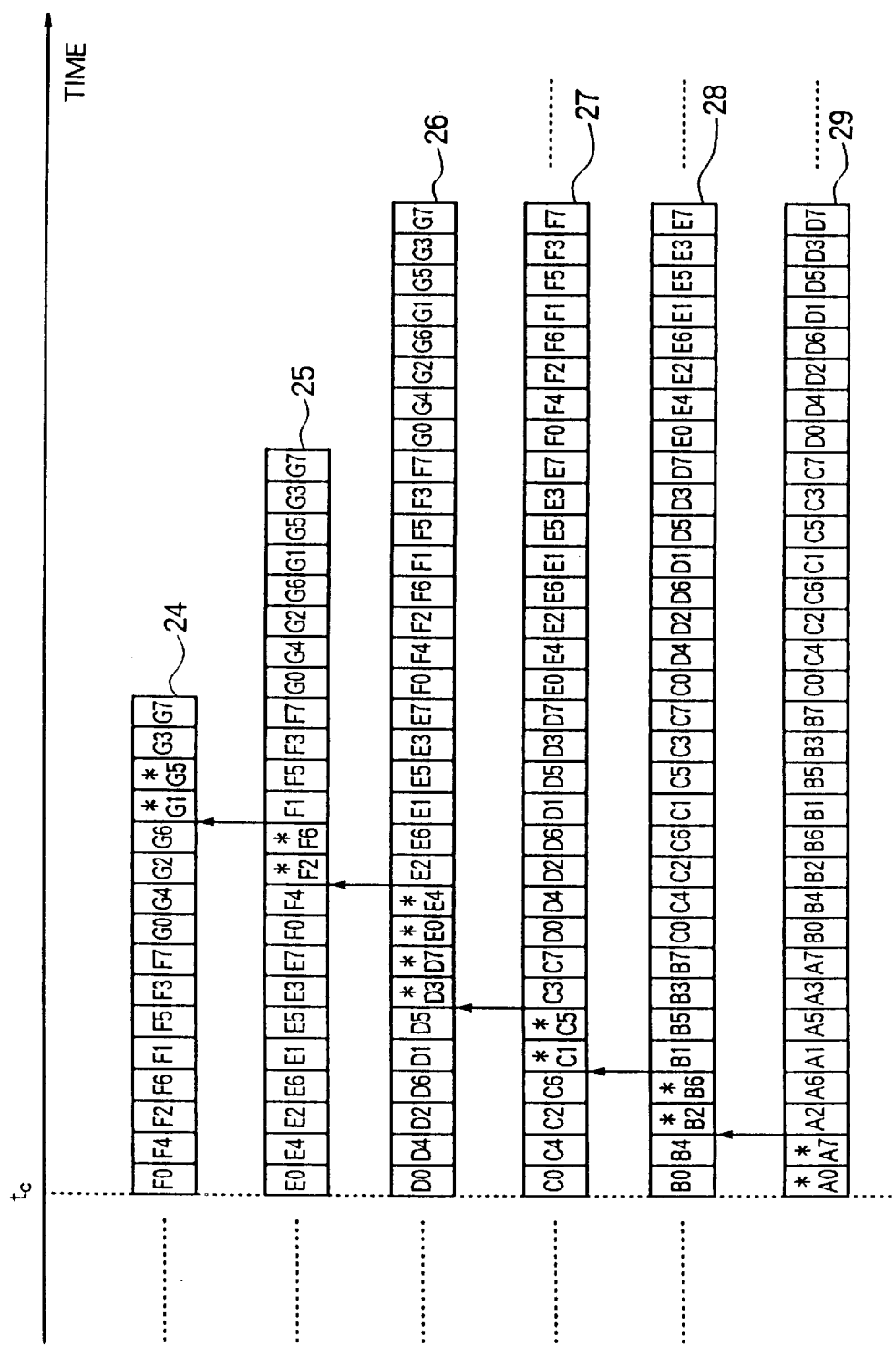
FIG. 20 is a diagram for explaining the switching operation of the selecting device shown in FIG. 4 when performing a 4×speed fast forward operation.

FIG. 20 is a diagram for explaining the switching operation of the selecting device 2_1 when performing a 4×speed fast forward operation.

For example, assume that the 4×speed fast forward operation is started from the time tc of the stream 29. In the example of FIG. 20, since each block is composed of eight segments, it is sufficient so far as the selecting device 2_1 takes out two segments from each block. In this case, the reordering devices 1_1, 1_2, 1_3, and 1_4 and the not illustrated reordering devices output the streams 24 to 29 shown in FIG. 20 to the selecting device 2_1, respectively.

Then, first, the selecting device 2_1 takes out the two segments A0 and A4 of the block A from the stream 29.

Next, the selecting device 2_1 switches the stream and takes out the two segments B2 and B6 of the block B from the stream 28. Next, the selecting device 2_1 switches the stream and takes out the two segments C1 and C5 of the block C from the stream 27. Next, the selecting device 2_1 switches the stream and takes out the two segments each, i.e., the segments D3 and D7 of the block D and the segments E0 and E4 of the block E, from the stream 26. Next, the selecting device 2_1 switches the stream and takes out the two segments F2 and F6 of the block F from the stream 25. Next, it switches the stream and takes out the two segments G1 and G5 of the block G from the stream 24.

As shown in FIG. 16(D), the selector 109 shown in FIG. 11 outputs the FF switch signal S108 indicating the value obtained by adding "−1" to the value of the D-FF 111 as the switch signal S109 to the selector 110 at a timing when the second, fourth, and sixth pulses of the segment pulse signal are output after the pulse of the block pulse signal BP is output.

Figure 21:
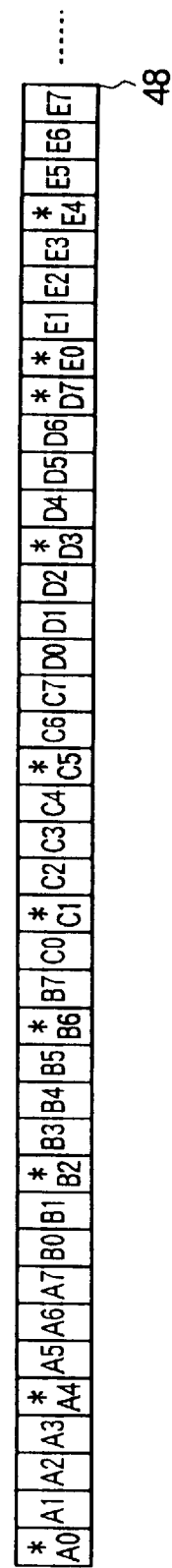
FIG. 21 is a diagram for explaining a stream generated in the repeat reordering device in a 4×speed fast forward operation.

At this time, the time series data output from the selecting device 2_1 to the repeat reordering device 3_1 becomes the data composed of the segments marked with "*" shown in FIG. 20. Two segments are taken out from each block, and a 4×speed fast forward operation is realized. Then, the repeat reordering device 3_1 rearranges the segments marked with "*" shown in FIG. 20 as shown in FIG. 21 and transmits the rearranged stream. As seen from FIG. 21, the number of the segments to be read becomes one-fourth in each block.

Figures 22, 23:
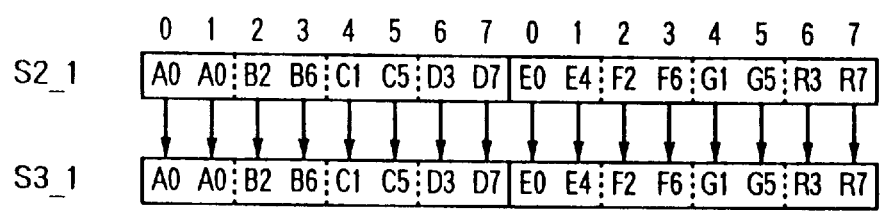
FIG. 22 is a diagram for explaining the processing for rearrangement in the case of 4×speed and 8×speed fast forward operations in the repeat reordering device.
FIG. 23 is a diagram for explaining the process for rearrangement in the case of a 4×speed fast forward operation in the repeat reordering device.

The repeat reordering device 3_1 stores (writes) the eight segments contained in each block constituting the input stream S2_1 in the regions indicated by the addresses "0", "1", "2", "3", "4", "5", "6", and "7" of the memory 1a shown in FIG. 9 as shown in, for example, FIG. 22. Then, in a state where the switch 1c is connected to the memory 1b side and the switch 1d is connected to the memory 1a side, the memory 1a is read out in an order of the addresses "0", "1", "2", "3", "4", "5", "6", and "7". This read out data is output as the stream S3_1 to the CRT 4_1. At this time, the repeat reordering device 3_1, as shown in FIG. 23, does not rearrange the segments for the input stream S2_1 and outputs the stream S2_1 as it is as the stream S3_1.

Case of 8×speed fast forward operation

Similarly, where the viewer requests an 8×speed fast forward operation, the repeat reordering is carried out by using exactly one-eighth of the segments of each block.

Figure 24:
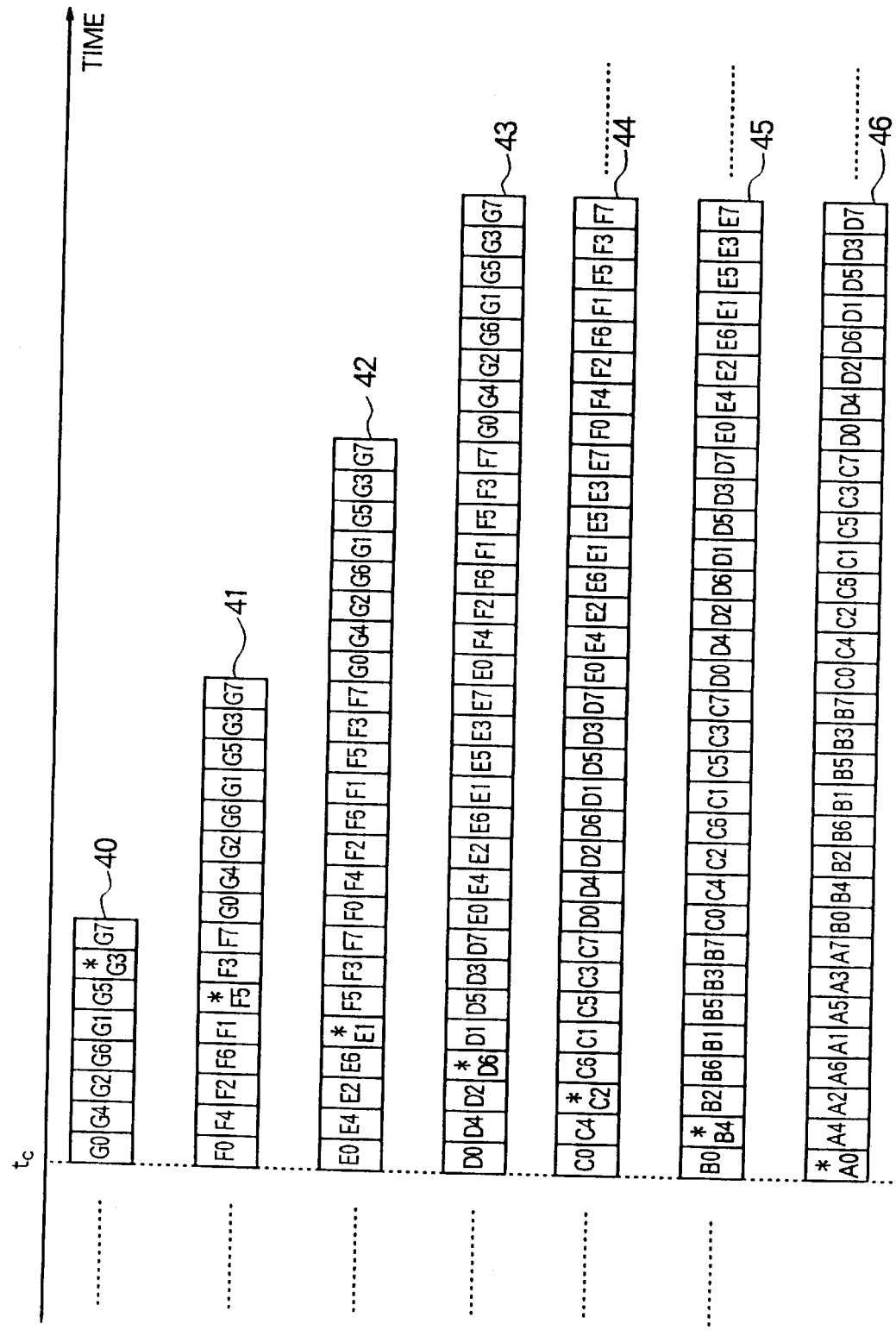
FIG. 24 is a diagram for explaining the switching operation of the selecting device shown in FIG. 4 when performing an 8×speed fast forward operation.

FIG. 24 is a diagram for explaining the switching operation of the selecting device 2_1 when performing an 8×speed fast forward operation.

For example, assume that the 8×speed fast forward operation is started from the time tc of the stream 46. In the example of FIG. 24, since each block is composed of eight segments, it is sufficient so far as two segments are taken out from each block.

In this case, the reordering devices 1_1, 1_2, 1_3, and 1_4 and the not illustrated reordering devices output the streams 40 to 46 shown in FIG. 24 to the selecting device 2_1. Then, first, the selecting device 2_1 takes out a segment A0 of the block A from the stream 46. Next, the selecting device 2_1 switches the stream and takes out a segment B4 of the block B from the stream 45. Next, the selecting device 2_1 switches the stream and takes out a segment C2 of the block C from the stream 44. Next, the selecting device 2_1 switches the stream and takes out a segment D6 of the block D from the stream 43. Next, the selecting device 2_1 switches the stream and takes out a segment E1 of the block E from the stream 42. Next, the selecting device 2_1 switches the stream and takes out a segment F5 of the block F from the stream 41. Next, the selecting device 2_1 switches the stream and takes out a segment G3 of the block G from the stream 40.

As shown in FIG. 16(E), the selector 109 shown in FIG. 11 outputs the FF switch signal S108 indicating the value obtained by adding "−1" to the value of the D-FF 111 as the switch signal S109 to the selector 110 at a timing when the first, second, third, fourth, fifth, sixth, and seventh pulses of the segment pulse signal are output after the block pulse signal BP is output.

Figure 25:
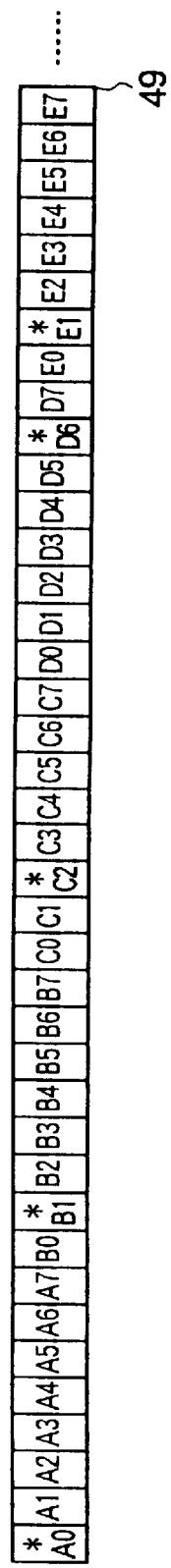
FIG. 25 is a diagram for explaining a stream generated in the repeat reordering device in an 8×speed fast forward operation.

At this time, the time series data output from the selecting device 2_1 to the repeat reordering device 3_1 becomes the data composed of the segments marked with "*" shown in FIG. 24. One segment is taken out from each block, and an 8×speed fast forward operation is realized. Then, the repeat reordering device 3_1 rearranges the segments marked with "*" shown in FIG. 24 as shown in FIG. 25 and transmits the rearranged stream. As seen from FIG. 25, the number of the segments to be read becomes one-eighth for each block.

Figure 26:
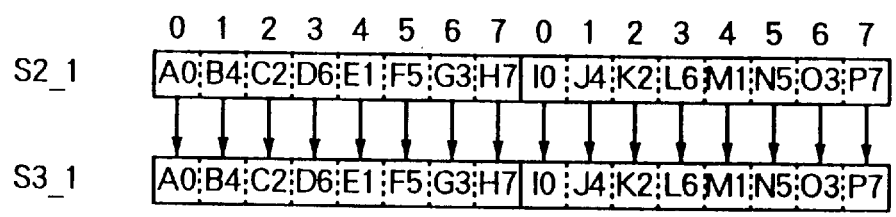
FIG. 26 is a diagram for explaining the processing for rearrangement in the case of an 8×speed fast forward operation in the repeat reordering device.

The repeat reordering device 3_1 stores (writes) the eight segments contained in each block constituting the input stream S2_1 shown in FIG. 4 in the regions indicated by the addresses "0", "1", "2", "3", "4", "5", "6", and "7" of the memory 1a shown in FIG. 9 as shown in, for example, FIG. 22. Then, in a state where the switch 1c is connected to the memory 1b side and the switch 1d is connected to the memory 1a side, the memory 1a is read out in an order of the addresses "0", "1", "2", "3", "4", "5", "6", and "7". This read out data is output as the stream S3_1 to the CRT 4_1. At this time, the repeat reordering device 3_1, as shown in FIG. 26, does not rearrange the segments for the input stream S2 and outputs the stream S2_1 as it is as the stream S3_1.

Next, an explanation will be made of the rewind operation.

Case of 1×speed rewind operation

The reordering device 1_1 rearranges the segments explained by using FIG. 7 and FIG. 8 in units of blocks and generates the stream S1_1. The stream S1_is output as it is as the stream S2_1 to the repeat reordering device 3_1 via for example the selecting device 2_1.

Figures 27, 28:
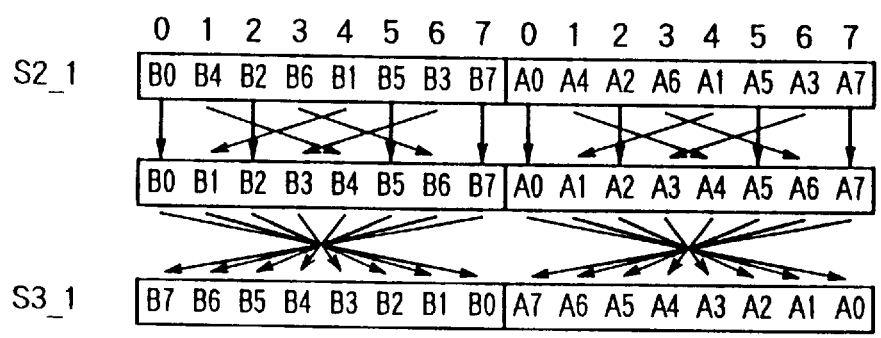
FIG. 27 is a diagram for explaining the processing for rearrangement in the case of a 1×speed rewind operation in the repeat reordering device.
FIG. 28 is a diagram for explaining the processing for rearrangement in the case of a 1×speed rewind operation in the repeat reordering device.

The repeat reordering device 3_1 stores (writes) the eight segments contained in each block constituting the input stream S2_1 in the regions indicated by the addresses "0", "1", "2", "3", "4", "5", "6", and "7" of the memory 1a shown in FIG. 9 as shown in, for example, FIG. 27. Then, in a state where the switch 1c is connected to the memory 1b side and the switch 1d is connected to the memory 1a side, the memory 1a is read out in an order of the addresses "7", "3", "5", "1", "6", "2", "4", and "0". This read out data is output as the stream S2_1 to the selecting device 2_1. At this time, the repeat reordering device 3_1 rearranges the segments for the input stream S2_1 as shown in FIG. 28 and outputs the stream S3_1.

Case of 2×speed rewind operation

Figure 29:
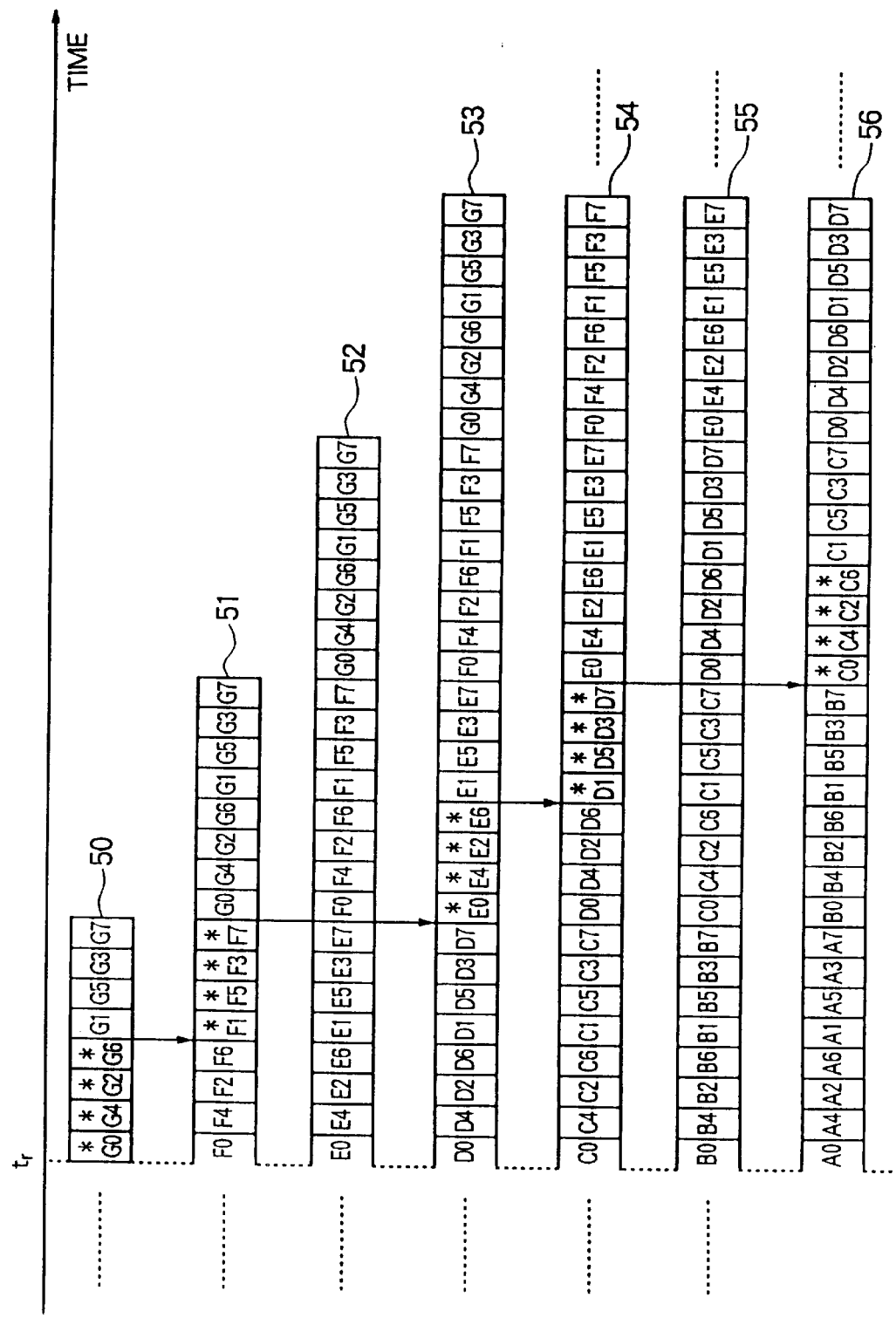
FIG. 29 is a diagram for explaining the switching operation of the selecting device shown in FIG. 4 when performing a 2×speed rewind operation.

FIG. 29 is a diagram for explaining the switching operation of the selecting device 2_1 shown in FIG. 4 when performing a 2×speed rewind operation.

In this case, the reordering devices 1_1, 1_2, 1_3, and 1_4 shown in FIG. 4 and not illustrated reordering devices output the streams 50 to 56 to the selecting device 2_1. Then, where the 2×speed rewind operation is commenced from the time tr of the stream 50, first, the selecting device 2_1 takes out the segments G0, G4, G2, and G6 of the block G from the stream 50. Next, the selecting device 2_1 switches the stream and takes out the segments F1, F5, F3, and F7 of the block F from the stream 51. Next, the selecting device 2_1 switches the stream and takes out the segments E0, E4, E2, and E6 of the block E from the stream 53. Next, the selecting device 2_1 switches the stream and takes out the segments D1, D5, D3, and D7 of the block D from the stream 54. Next, the selecting device 2_1 switches the stream and takes out the segments G0, G4, G2, and G6 of the block G from the stream 56.

As shown in FIG. 16(F), the selector 109 shown in FIG. 11 outputs the REW switch signal S107 indicating the value obtained by adding "2" to the value of the D-FF 111 at the time of the pulse output of the block pulse signal BP as the switch signal S109 to the selector 110, outputs the block pulse signal BP, and then outputs the REW switch signal S107 indicating the value obtained by adding "1" to the value of D-FF 111 as the switch signal S109 to the selector 110 at the timing when the fourth pulse of the segment pulse signal SP is output.

Here, the addition of "1" to the value of the D-FF 111 means, as shown in FIG. 29, the switching to the adjoining stream in the direction from the stream 50 toward the stream 56 such as switching from the stream 50 to the stream 51 and switching from the stream 53 to the stream 54. Further, the addition of "2" to the value of the D-FF 111 means, as shown in FIG. 29, the switching of the stream while skipping exactly one stream in the direction from the stream 50 toward the stream 56 such as switching from the stream 51 to the stream 53 and switching from the stream 54 to the stream 56.

Figure 30:
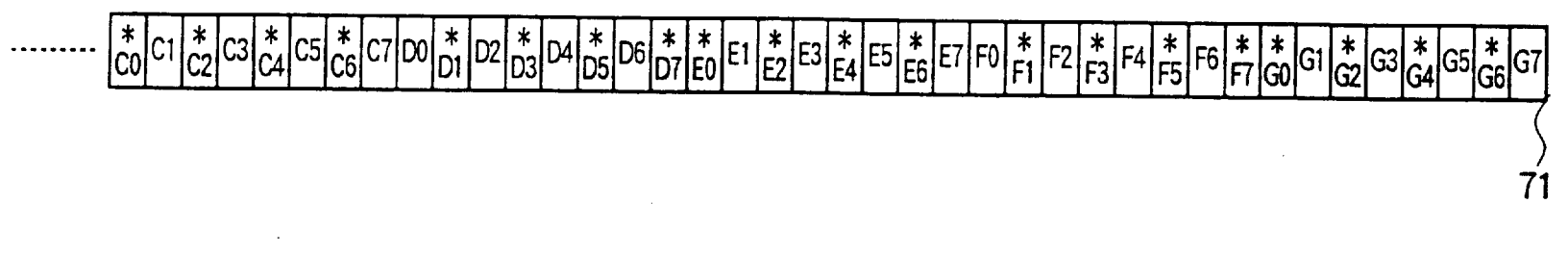

At this time, the time series data output from the selecting device 2_1 to the repeat reordering device 3_1 becomes the data composed of the segments marked by "*" shown in FIG. 29. Four segments each are taken out from each block, and a 2×speed rewind operation is realized. Then, the repeat reordering device 3_1 rearranges the segments marked with "*" shown in FIG. 29 as shown in FIG. 30 and transmits the rearranged stream.

Figures 31, 32:
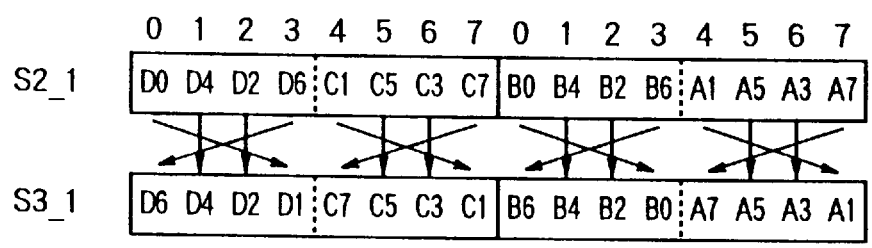
FIG. 31 is a diagram for explaining the processing for rearrangement in the case of a 2×speed rewind operation in the repeat reordering device.
FIG. 32 is a diagram for explaining the processing for rearrangement in the case of a 2×speed rewind operation in the repeat reordering device.

The repeat reordering device 3_1 stores (writes) the eight segments contained in each block constituting the input stream S2_1 in the regions indicated by the addresses "0", "1", "2", "3", "4", "5", "6", and "7" of the memory 1a shown in FIG. 9 as shown in, for example, FIG. 31. Then, in a state where the switch 1c is connected to the memory 1b side and the switch 1d is connected to the memory 1a side, the memory 1a is read out in an order of the addresses "3", "1", "2", "0", "7", "5", "6", and "4". This read out data is output as the stream S2_1 to the selecting device 2_1. At this time, the repeat reordering device 3_1 rearranges the segments for the input stream S2_1 as shown in FIG. 32 and outputs the stream S3_1.

Case of 4×speed rewind operation

Next, an explanation will be made of a case where a 4×speed rewind operation is carried out.

Figure 33:
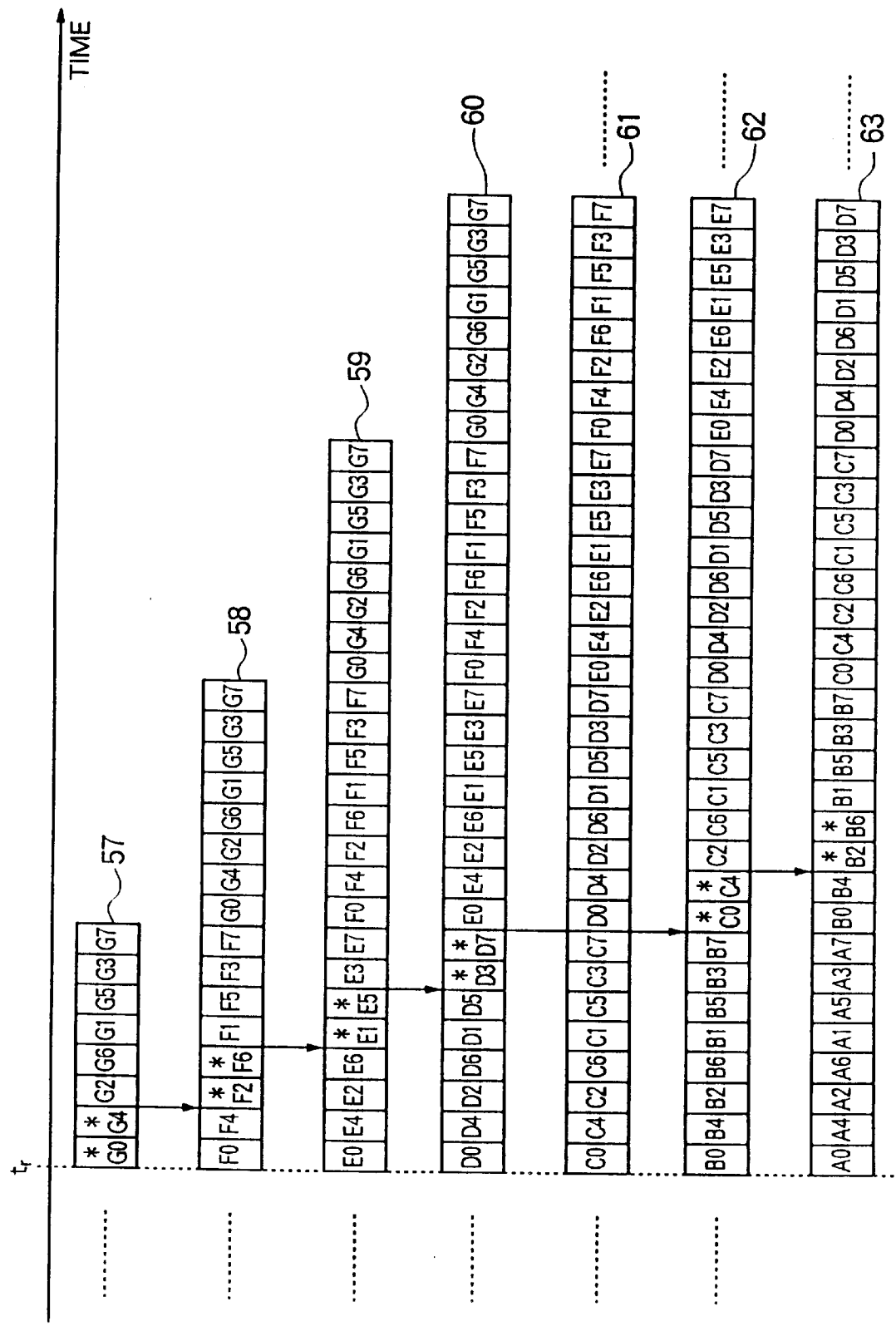
FIG. 33 is a diagram for explaining the switching operation of the selecting device shown in FIG. 4 when performing a 4×speed rewind operation.

FIG. 33 is a diagram for explaining the switching operation of the selecting device 2_1 shown in FIG. 4 when performing a 4×speed rewind operation.

The streams 57 to 63 are output from the reordering device 1_1 to the selecting device 2_1. Where the 4×speed rewind operation is commenced from the time tr of the stream 57, first, the selecting device 2_1 takes out the segments G0 and G4 of the block G from the stream 57. Next, the selecting device 2_1 switches the stream and takes out the segments F2 and F6 of the block F from the stream 58. Next, the selecting device 2_1 switches the stream and takes out the segments E1 and E5 of the block E from the stream 59. Next, the selecting device 2_1 switches the stream and takes out the segments D3 and D7 of the block D from the stream 60. Next, the selecting device 2_1 switches the stream and takes out the segments C0 and C4 of the block C from the stream 62. Next, the selecting device 2_1 switches the stream and takes out the segments B2 and B6 of the block B from the stream 63.

As shown in FIG. 16(G), the selector 109 shown in FIG. 11 defines the REW switch signal S107 indicating the value obtained by adding "2" to the value of the D-FF 111 at the time of the pulse output of the block pulse signal BP as the switch signal S109. Then, it outputs this switch signal S109 to the selector 110, and after the output of the block pulse signal BP, outputs the REW switch signal S107 indicating the value obtained by adding "1" to the value of D-FF 111 as the switch signal S109 to the selector 110 at the timing when the second, fourth and sixth pulses of the segment pulse signal SP are output.

Figure 34:
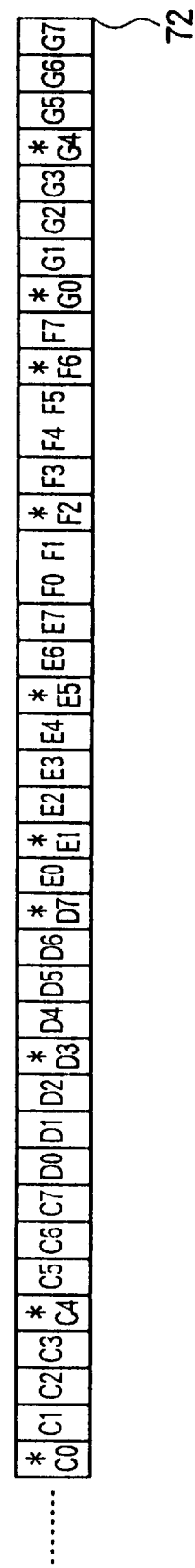
FIG. 34 is a diagram for explaining a stream generated in the repeat reordering device in a 4×speed rewind operation.

At this time, the time series data output from the selecting device 2_1 to the repeat reordering device 3_1 becomes the data composed of the segments marked by "*" shown in FIG. 33. Two segments each are taken out from each block, and a 4×speed rewind operation is realized. Then, the repeat reordering device 3_1 rearranges the segments marked with "*" shown in FIG. 33 as shown in FIG. 34 and transmits the rearranged stream.

The repeat reordering device 3_1 stores (writes) the eight segments contained in each block constituting the input stream S2_1 in the regions indicated by the addresses "0", "1", "2", "3", "4", "5", "6", and "7" of the memory 1a shown in FIG. 9 as shown in, for example, FIG. 35. Then, in a state where the switch 1c is connected to the memory 1b side and the switch 1d is connected to the memory 1a side, the memory 1a is read out in an order of the addresses "1", "0", "3", "2", "5", "4", "7", and "6". This read out data is output as the stream S2_1 to the selecting device 2_1. At this time, the repeat reordering device 3_1 rearranges the segments for the input stream S2_1 as shown in FIG. 36 and outputs the stream S3_1.

Case of 8×speed rewind operation

Next, an explanation will be made of the case where an 8×speed rewind operation is carried out.

Figure 37:
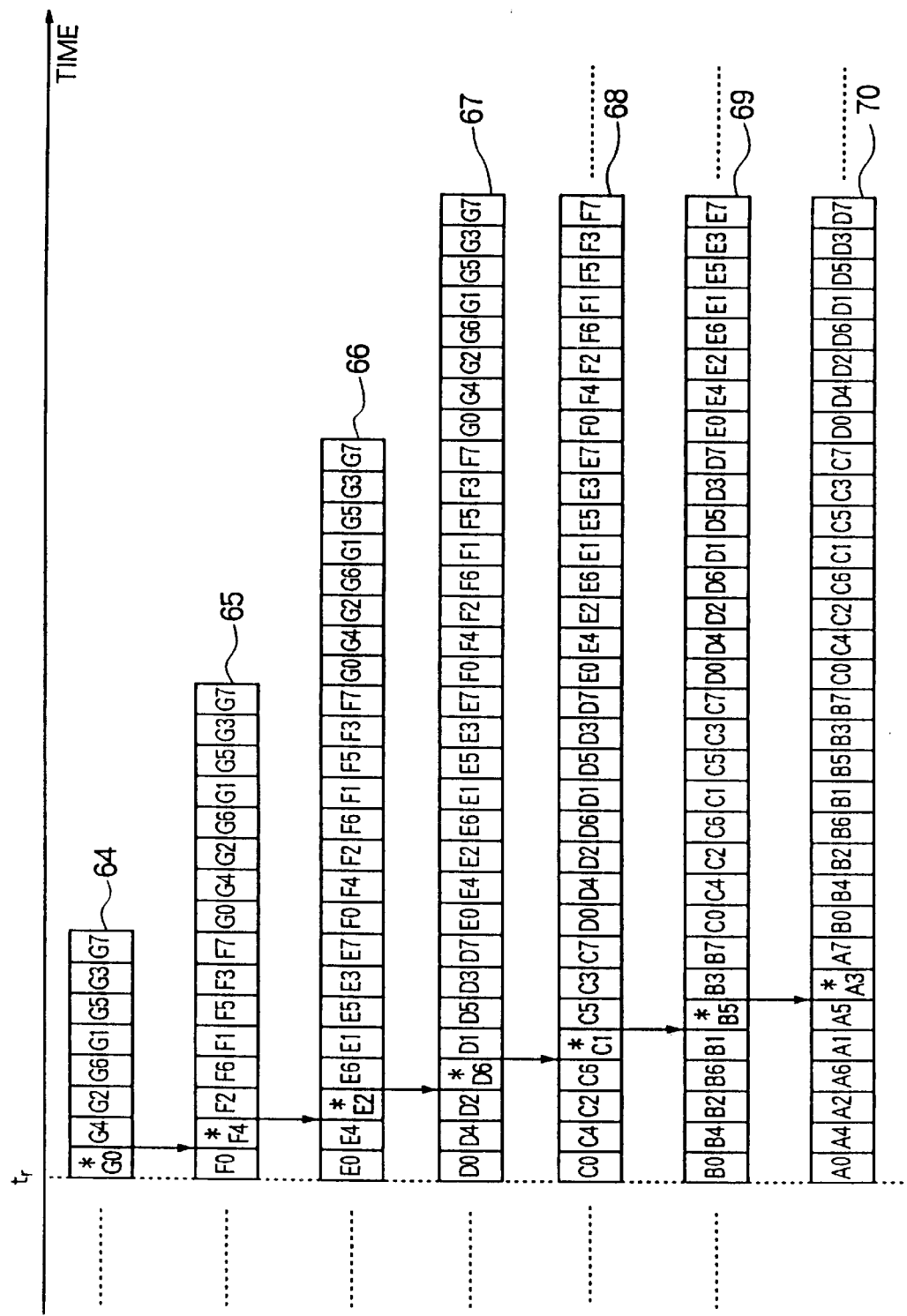
FIG. 37 is a diagram for explaining the switching operation of the selecting device shown in FIG. 4 when performing an 8×speed rewind operation.

FIG. 37 is a diagram for explaining the switching operation of the selecting device 2_1 shown in FIG. 4 when performing an 8×speed rewind operation.

Streams 64 to 70 are output from the reordering devices 1_1, 1_2, 1_3, and 1_4 and not illustrated reordering devices to the selecting device 2_1. Where the 8×speed rewind operation is commenced from the time tr of the stream 64, first, the selecting device 2_1 takes out the segment G0 of the block G from the stream 64. Next, the selecting device 2_1 switches the stream and takes out the segment F4 of the block F from the stream 65. Next, the selecting device 2_1 switches the stream and takes out the segment E2 of the block E from the stream 66. Next, the selecting device 2_1 switches the stream and takes out the segment D6 of the block D from the stream 67. Next, the selecting device 2_1 switches the stream and takes out the segment C1 of the block C from the stream 68. Next, the selecting device 2_1 switches the stream and takes out the segment B5 of the block B from the stream 69. Next, the selecting device 2_1 switches the stream and takes out the segment A3 of the block A from the stream 70. As shown in FIG. 16(H), the selector 109 shown in FIG. 11 outputs the REW switch signal S107 obtained by adding "2" to the value of the D-FF 111 as the switch signal S109 to the selector 110 at the time of the pulse output of the block pulse signal BP, and after the output of the block pulse signal BP, outputs the REW switch signal S107 obtained by adding "1" to the value of D-FF 111 as the switch signal S109 to the selector 110 at the timing when the first, second, third, fourth, fifth, sixth, and seventh pulses of the segment pulse signal SP are output.

At this time, the time series data output from the selecting device 2_1 to the repeat reordering device 3_1 becomes the data composed of the segments marked by "*" shown in FIG. 37. Two segments each are taken out from each block, and the 8×speed rewind operation is realized. Then, the repeat reordering device 3_1 rearranges the segments marked with "1" shown in FIG. 37 as shown in FIG. 38 and transmits the rearranged stream.

Figures 39, 40:
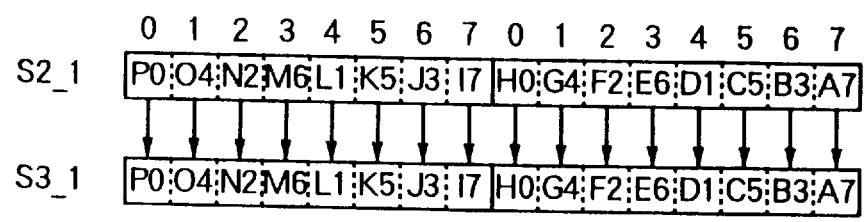
FIG. 39 is a diagram for explaining the processing for rearrangement in the case of an 8×speed rewind operation in the repeat reordering device.
FIG. 40 is a diagram for explaining the processing for rearrangement in the case of an 8×speed rewind operation in the repeat reordering device.

The repeat reordering device 3_1 stores (writes) the eight segments contained in each block constituting the input stream S2_1 in the regions indicated by the addresses "0", "1", "2", "3", "4", "5", "6", and "7" of the memory 1a shown in FIG. 9 as shown in for example FIG. 39. Then, in a state where the switch 1c is connected to the memory 1b side and the switch 1d is connected to the memory 1a side, the memory 1a is read out in an order of the addresses "0", "1", "2", "3", "4", "5", "6", and "7". This read out data is output as the stream S3_1 to the selecting device 4_1. At this time, the repeat reordering device 3_1 rearranges the segments for the input stream S2_1 as shown in FIG. 40 and outputs the stream S3_1.

Figure 38:
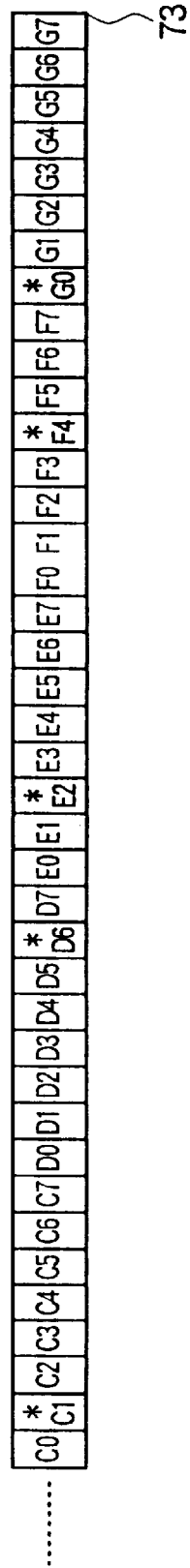
FIG. 38 is a diagram for explaining a stream generated in the repeat reordering device in an 8×speed rewind operation.

FIG. 30, FIG. 34, and FIG. 38 show the states of the 2×speed, 4×speed, and 8×speed rewind operations seen by a time series, respectively. It is seen that for each block, the number of the segments read becomes one-half, one-fourth, and one-eighth of the number of segments of the block, respectively.

Further, when assuming that for example n=3 and the block A is divided into nine segments A0 to A8, since 9 is the square of 3, 0 to 8 are represented by 2-bit trinary numbers to which A0 to A8 are made to correspond, respectively (FIG. 41(a)).

Figure 41:
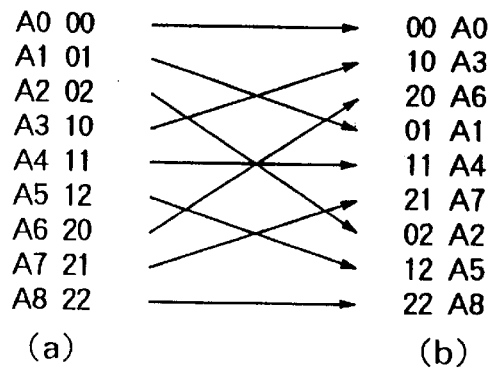
FIG. 41 is a diagram for explaining the processing for rearrangement of the segments in the reordering device shown in FIG. 1 in the case of use of a bit reverse operation of a power of 3 in the embodiment of the present invention.
Figure 42:
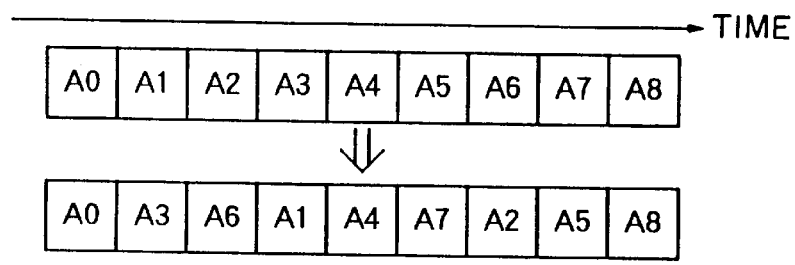
FIG. 42 is a diagram for explaining the relationship between the time series data before the rearrangement of the segments is carried out and the time series data after the rearrangement of the segments is carried out in the case shown in FIG. 41.
Figure 43:
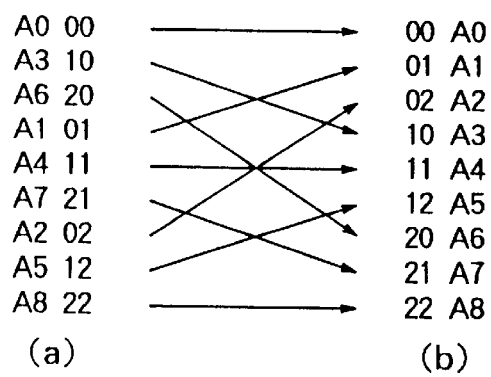
FIG. 43 is a diagram for explaining the process for restoring the arrangement of the segments in the repeat reordering device in the case shown in FIG. 41.
Figure 44:
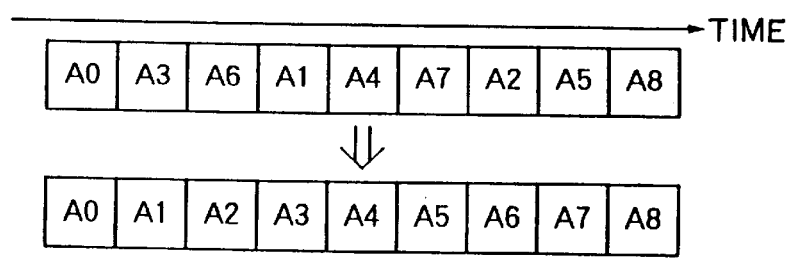
FIG. 44 is a diagram for explaining the relationship between the time series data for which the rearrangement of the segments is carried out and the time series data after the rearrangement of the segments is reversed in the case shown in FIG. 41.

Then, similar to the time when each block is divided into eight, a bit reverse operation is carried out on the trinary numbers (FIG. 41). FIG. 42 shows the result of the change at that time. Further, similarly, also in the repeat reordering, the same bit reverse operation is carried out on the trinary numbers (FIG. 43). The situation is shown in FIG. 44. Although not indicated by the drawings, with the same thinking as in the above embodiment, when numbering the segments by trinary numbers, it is possible to realize 3×speed and 9×speed fast forward operations and rewind operations by switching the streams.

Further, similarly, when numbering the blocks by n-ary numbers, it is possible to realize fast forward operations and rewind operations of speeds of multiples of powers of n by switching the streams.

It was explained that special reproduction of variable speed is possible if the above method was used.

As understood when viewing FIG. 17, FIG. 21, FIG. 25, FIG. 30, FIG. 34, and FIG. 38, however, complete fast forward operations and rewind operations are not realized even when using the present procedure. While complete special reproduction is achieved when viewed within the blocks, distortion is generated between blocks.

For example, the 2×speed fast forward operation shown in FIG. 17 is a complete multiple speed fast forward operation viewed within each block since every other segment is accessed. However, the last segment of the block A which is accessed and the first segment of the block B are spaced apart from each other on a time series by 2 segments. Further, conversely the last segment of the block B and the first segment of the block C are adjacent to each other.

Similarly, in the 4×speed fast forward operation of FIG. 21, since each block is composed of eight segments, ideally there is an access at intervals of 3 segments, but in actuality there are portions in which the access is made at intervals of 5 segments or adjoining segments are reproduced.

Here, while it is difficult to realize special reproduction having a high precision in all cases of variable speeds, there have been requests to raise the precision even for just 2×speed special reproduction which is most frequently carried out.

Figure 45:
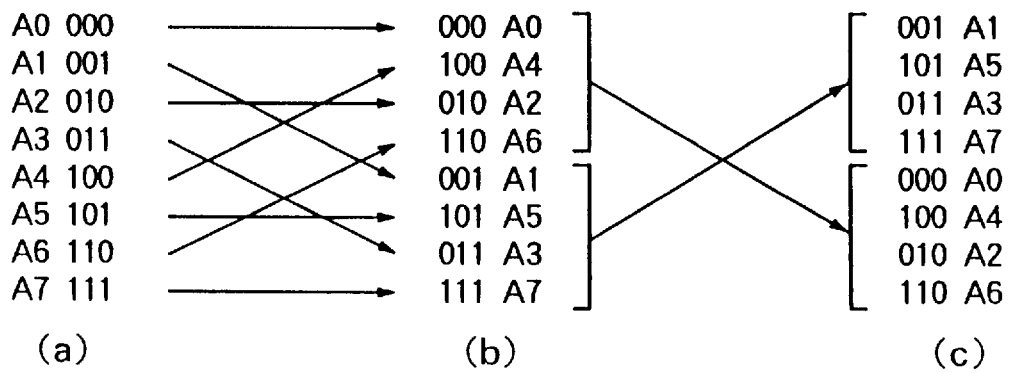
FIG. 45 is a diagram for explaining the processing in the reordering device in an improved version of the bit reverse operation in the present embodiment.
Figure 46:
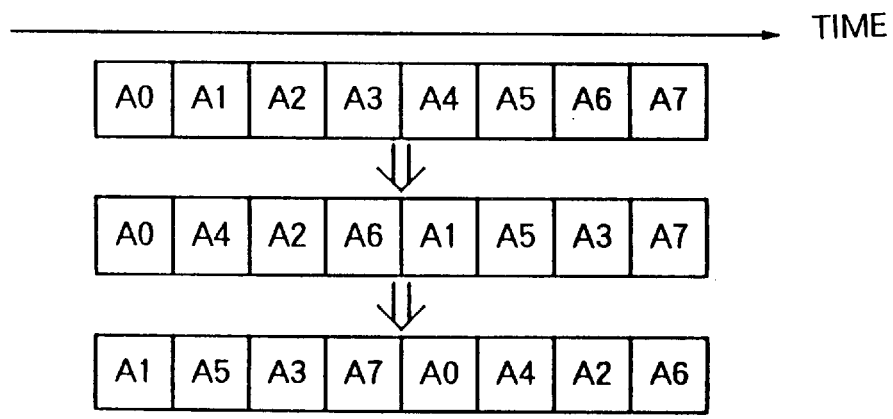
FIG. 46 is a diagram for explaining the change of the time series data in the case shown in FIG. 45.
Figure 47:
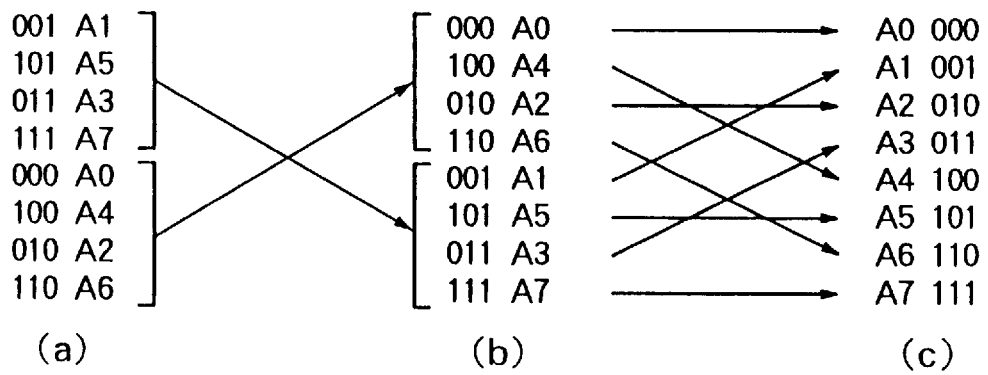
FIG. 47 is a diagram for explaining the processing in the repeat reordering device in the improved version of the bit reverse operation in the present embodiment.
Figure 48:
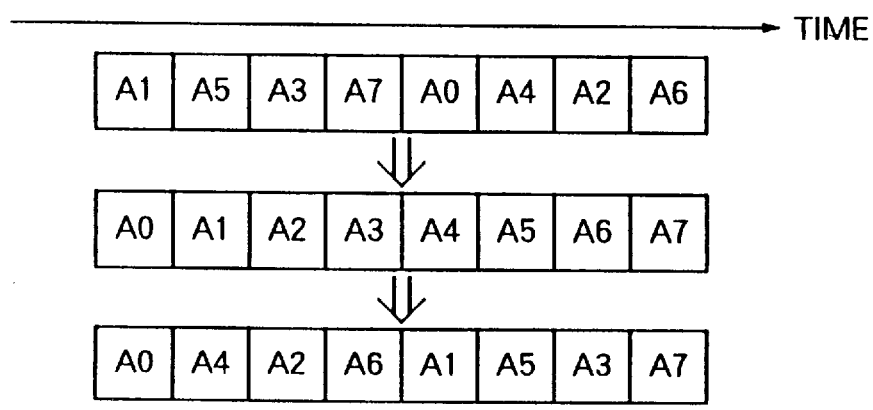
FIG. 48 is a diagram for explaining the change of the time series data in the case shown in FIG. 47.

Therefore, the reordering by the bit reverse operation is improved and the method of reordering changed for every block. For example, where a block is divided into eight segments, after the usual bit reverse operation is carried out as shown in FIG. 45 (FIG. 45(b)), the four segments of the first half and the four segments of the latter half are further switched with each other (FIG. 45(c)). As a result, the data in the block exhibit the order as shown in FIG. 46. In order to reverse this reordering (hereinafter, referred to as an improved bit reverse operation) to the original state, as shown in FIG. 47, it is sufficient to apply the bit reverse operation after first switching the four segments of the first half and latter half. The situation thereof is shown in FIG. 48.

Figure 49:
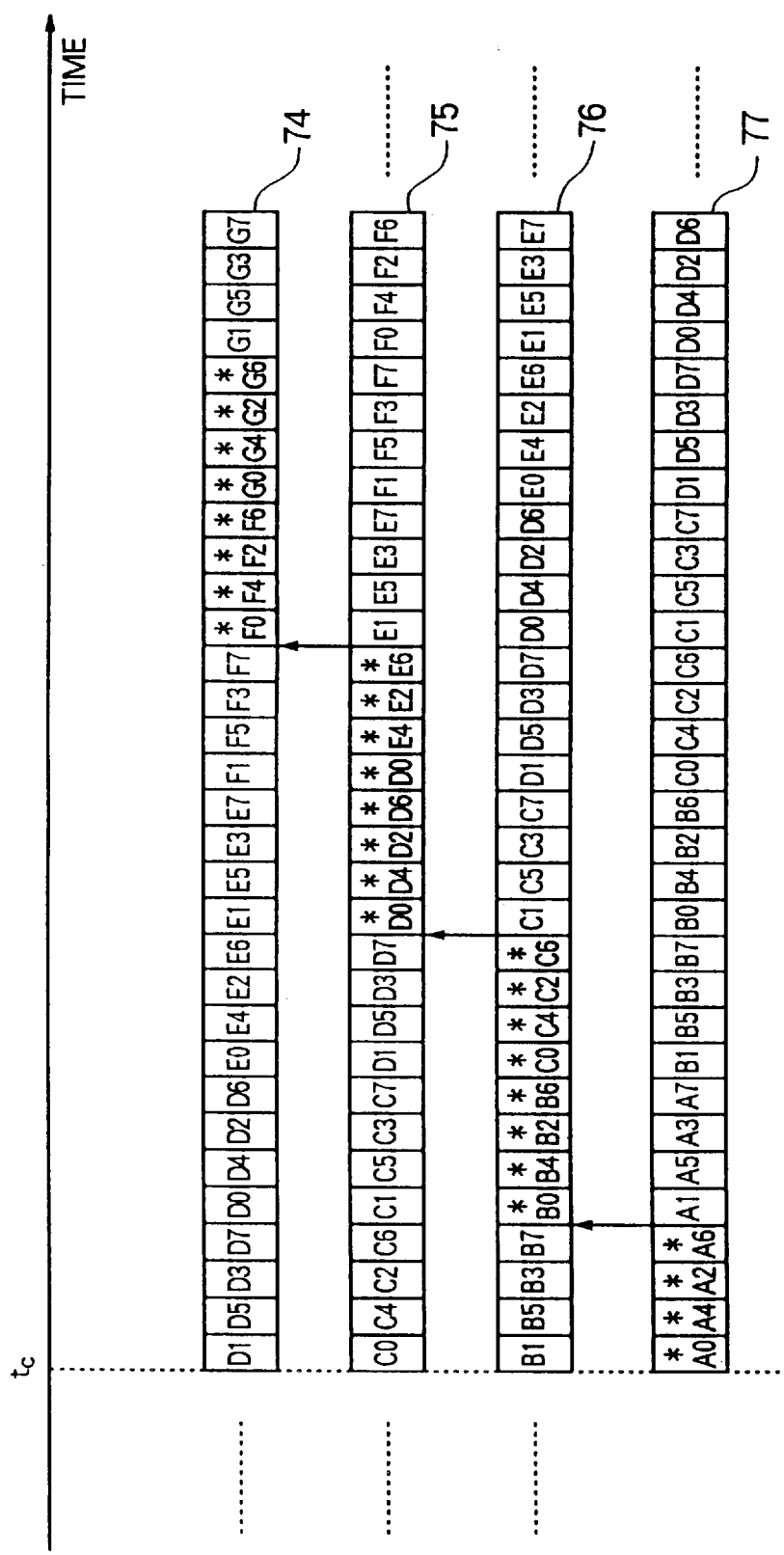
FIG. 49 is a diagram for explaining the 2×speed fast forward operation by the improved version of the bit reverse operation in the present embodiment.
Figure 50:
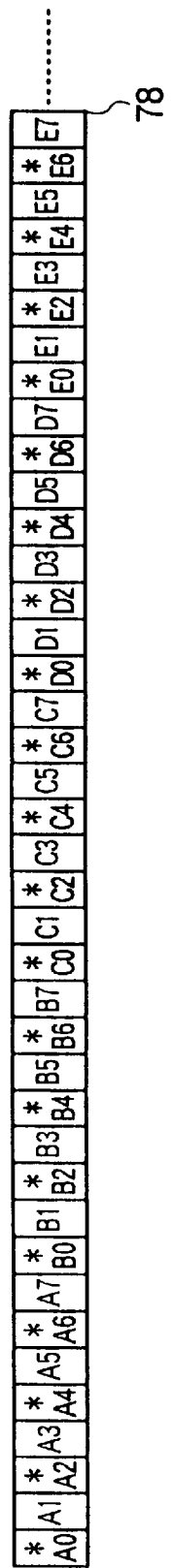
FIG. 50 is a diagram for explaining the data restored in the repeat reordering device in the case shown in FIG. 49.

A case where this improved bit reverse operation and the usual bit reverse operation are alternately carried out for every block to carry out a 2×speed fast forward operation is shown in FIG. 49. As seen well from the comparison with FIG. 15, the usual bit reverse operation is applied to the odd numbered letter designated blocks (A, C, E, and G) from the start and the improved bit reverse operation is applied to the even numbered letter designated blocks (B, D, and F). When viewing the selected segments in a time series, they become the segments marked by "*" as shown in FIG. 50. It is seen that the access is made at every other segment throughout the blocks.

In a 2×speed rewind operation as well, similarly, if the improved bit reverse procedure is used, access at every other segment becomes completely possible.

Further, while the procedure of switching the four segments of the first half and four segments of the latter half with each other for the order after the bit reverse operation was used as the improved bit reverse operation in the present embodiment, the same effect can be obtained even if another rearrangement procedure is used.

Further, while the present embodiment uses two rearrangement procedures alternately, it is possible to obtain the same effects even if three or more rearrangement procedures are used and the procedure is changed for every block.

As explained above, according to the data transmitting apparatus of the present embodiment and the method thereof, even if there is a flood of transmission requests for the same data, it is possible to handle those requests.

Further, according to the data transmitting apparatus of the present embodiment and the method thereof, it is pos-sible to handle requests for the data to be transmitted at variable speeds of 2×speed, 4×speed, etc.

As explained above, according to the data transmitting apparatus of the present embodiment and the method thereof, even if there is a flood of transmission requests for the same data, it is possible to handle those requests.

Further, according to the data transmitting apparatus of the present embodiment and the method thereof, even in a case when handling a plurality of transmission requests by a single stream, it is possible to realize special reproduction formats such as fast forward, rewind, pause, etc.

Further, according to the data transmitting apparatus of the present embodiment and the method thereof, a high quality fast forward and rewind operation can be carried out.

Note that the best modes for working the data receiving apparatus of the present invention and the method thereof correspond to the best modes for working the data transmitting apparatus and the method thereof explained above.

INDUSTRIAL APPLICABILITY

The data transmitting apparatus of the present invention and method thereof and the data receiving apparatus and method thereof can be used for services such as VOD in various circumstances.

We claim:

1. A method for transmitting a plurality of time series data having the same content to be transmitted staggered in time by the amount of block data of a predetermined size, each of said plurality of time series data comprising a plurality of block data, each of said block data comprising a plurality of segment data of predetermined size, said method comprising the steps of:

rearranging the order of said plurality of segment data by a predetermined pattern in units of the corresponding block data; and transmitting the plurality of rearranged time series data in which said plurality of segment data are rearranged.

2. A method according to claim 1, wherein each interval of said plurality of segment data constituting said block data is defined so that the intervals of said block data become a power of n of said intervals of said segment data, where n is an integer of 2 or more.

3. An apparatus for transmitting a plurality of time series data having the same content to be transmitted staggered in time by the amount of block data of a predetermined size, each of said plurality of time series data comprising a plurality of block data, each of said block data comprising a plurality of segment data of predetermined size, said apparatus comprising:

a rearranging means for rearranging the order of said plurality of segment data by a predetermined pattern in units of the corresponding block data; and a transmitting means for transmitting the plurality of rearranged time series data in which said plurality of segment data are rearranged.

4. An apparatus according to claim 3, wherein each interval of said plurality of segment data constituting said block data is defined so that the intervals of said block data become a power of n of said intervals of said segment data, where n is an integer of 2 or more.

5. A data transmitting apparatus comprising:

a rearranging means for rearranging, for a plurality of time series data having the same content to be transmitted staggered in time by exactly the amount of block data of a predetermined size, the order of a plurality of segment data of predetermined sizes constituting that block data by a predetermined pattern in units of the corresponding block data;

a selecting means for selecting one from among the plurality of rearranged time series data; and a repeat rearranging means for restoring the order of the segment data of the selected time series data in units of the block data.

6. A data transmitting apparatus as set forth in claim 5, wherein the selecting means successively switches and selects one from among the plurality of rearranged time series data at predetermined time intervals in accordance with the predetermined speed.

7. A data transmitting apparatus as set forth in claim 6, wherein the rearranging means rearranges the order of the segment data in a pattern which arranges the segment data at positions corresponding to numbers obtained by reading in a reverse direction numbers given when numbering in a base n format in a temporal order the segment data contained in the block data.

8. A data transmitting apparatus as set forth in claim 6, wherein the rearranging means rearranges the order of the segment data by using different patterns for adjoining block data so that the time series data restored by the repeat rearranging means comprises segments located at predetermined intervals in the time series data before the rearrangement.

9. A data transmitting apparatus as set forth in claim 5, wherein the rearranging means rearranges the order of the segment data in a pattern which arranges the segment data at positions corresponding to numbers obtained by reading in a reverse direction numbers given when numbering in a base n format, n being an integer of 2 or more, in a temporal order the segment data contained in the block data.

10. A data transmitting apparatus as set forth in claim 9, wherein the rearranging means rearranges the order of the segment data by using different patterns for adjoining block data so that the time series data restored by the repeat rearranging means comprises segments located at predetermined intervals in the time series data before the rearrangement.

11. A data transmitting apparatus as set forth in claim 5, wherein the rearranging means rearranges the order of the segment data by using different patterns for adjoining block data so that the time series data restored by the repeat rearranging means comprises segments located at predetermined intervals in the time series data before the rearrangement.

12. A data transmitting apparatus as set forth in claim 5, wherein said selecting means selects a segment data from said plurality of segment data constituting said block data in accordance with a predetermined speed.

13. A data transmitting apparatus as set forth in claim 5, wherein each interval of said plurality of segment data constituting said block data is defined so that the intervals of said block data become a power of n of said intervals of said segment data, where n is an integer of 2 or more.

14. A data transmitting apparatus as set forth in claim 5, wherein said time series data comprises video data.

15. A data transmitting method comprising the steps of:

rearranging, for a plurality of time series data having the same content to be transmitted staggered in time by the amount of block data of a predetermined size, the order of a plurality of segment data of predetermined sizes constituting that block data by a predetermined pattern in units of the corresponding block data;

selecting one from among the plurality of rearranged time series data; and restoring the order of the segment data of the selected time series data in units of the block data.

16. A data transmitting method as set forth in claim 15, wherein said selecting step includes the step of selecting the time series data by successively switching one from among the plurality of rearranged time series data at predetermined time intervals in accordance with the predetermined speed.

17. A data transmitting method as set forth in claim 16, wherein said rearranging step includes the step of rearranging the order of the segment data at positions corresponding to numbers obtained by reading in a reverse direction numbers given when numbering in a base n format in a temporal order the segment data contained in the block data.

18. A data transmitting method as set forth in claim 16, wherein said rearranging step includes the step of rearranging the segment data by using different patterns for adjoining block data so that the restored time series data comprises segments located at predetermined intervals in the time series data before the rearrangement.

19. A data transmitting method as set forth in claim 15, wherein said rearranging step includes the step of rearranging the order of the segment data at positions corresponding to numbers obtained by reading in a reverse direction numbers given when numbering in the base n format in a temporal order the segment data contained in the block data.

20. A data transmitting method as set forth in claim 19, wherein said rearranging step includes the step of rearranging the segment data by using different patterns for adjoining block data so that the restored time series data comprises segments located at predetermined intervals in the time series data before the rearrangement.

21. A data transmitting method as set forth in claim 15, wherein said rearranging step includes the step of rearranging the segment data by using different patterns for adjoining block data so that the restored time series data comprises segments located at predetermined intervals in the time series data before the rearrangement.

22. A data transmitting method as set forth in claim 15, wherein said selecting step includes the step of selecting a segment data from said plurality of segment data constituting said block data in accordance with a predetermined speed.

23. A data transmitting method as set forth in claim 15, wherein each interval of said plurality of segment data constituting said block data is defined so that the intervals of said block data become a power of n of said intervals of said segment data, where n is an integer of 2 or more.

24. A data receiving apparatus which selectively receives a plurality of time series data having the same content transmitted staggered in time by the amount of a block of a predetermined size, the block data comprising a plurality of segment data of predetermined sizes; and each of the plurality of time series data having the order of the plurality of segment data rearranged to a predetermined pattern in units of the corresponding block data, said apparatus comprising:

a selecting means for selecting one from among the plurality of rearranged time series data; and a repeat rearranging means for restoring the order of the segments of the selected time series data in units of the block data.

25. A data receiving apparatus as set forth in claim 24, wherein the selecting means successively switches and selects one from among the plurality of rearranged time series data at predetermined time intervals in accordance with a predetermined speed.

26. A data receiving apparatus as set forth in claim 24, wherein said selecting means selects a segment data from said plurality of segment data constituting said block data in accordance with a predetermined speed.

27. A data receiving apparatus as set forth in claim 24, wherein each interval of said plurality of segment data constituting said block data is defined so that the intervals of said block data become a power of n of said intervals of said segment data, where n is an integer of 2 or more.

28. A data receiving method which selectively receives the plurality of time series data having the same content transmitted staggered in time by the amount of a block of a predetermined size, the block data comprising a plurality of segment data of predetermined sizes, and each of the plurality of time series data having the order of the plurality of segment data rearranged to a predetermined pattern in units of the corresponding block data, said method comprising the steps of:

selecting one from among the plurality of rearranged time series data; and restoring the order of the segments of the selected time series data in units of the block data.

29. A data receiving method as set forth in claim 28, wherein said selecting step includes the step of selecting the time series data by successively switching one from among the plurality of rearranged time series data at predetermined time intervals in accordance with the predetermined speed.

30. A data receiving method as set forth in claim 28, wherein said selecting step includes the step of selecting a segment data from said plurality of segment data constituting said block data in accordance with a predetermined speed.

31. A data receiving method as set forth in claim 28, wherein each interval of said plurality of segment data constituting said block data is defined so that the intervals of said block data become a power of n of said intervals of said segment data, where n is an integer of 2 or more.

* * * * *